Nov. 24, 1959  R. I. ROTH  2,914,245
ACCOUNTING MACHINE CONTROLLED BY DIFFERENTLY CODED
CARDS WITH DATA COMPARISON OF SUCCESSIVE CARDS
Filed Dec. 28, 1956  15 Sheets-Sheet 1

INVENTOR.
ROBERT I. ROTH
BY J. W. Lomnitzer
ATTORNEY

INVENTOR.
ROBERT I. ROTH

BY J. W. Lomnitzer

ATTORNEY

Nov. 24, 1959 R. I. ROTH 2,914,245
ACCOUNTING MACHINE CONTROLLED BY DIFFERENTLY CODED
CARDS WITH DATA COMPARISON OF SUCCESSIVE CARDS
Filed Dec. 28, 1956 15 Sheets-Sheet 3
FIG.4
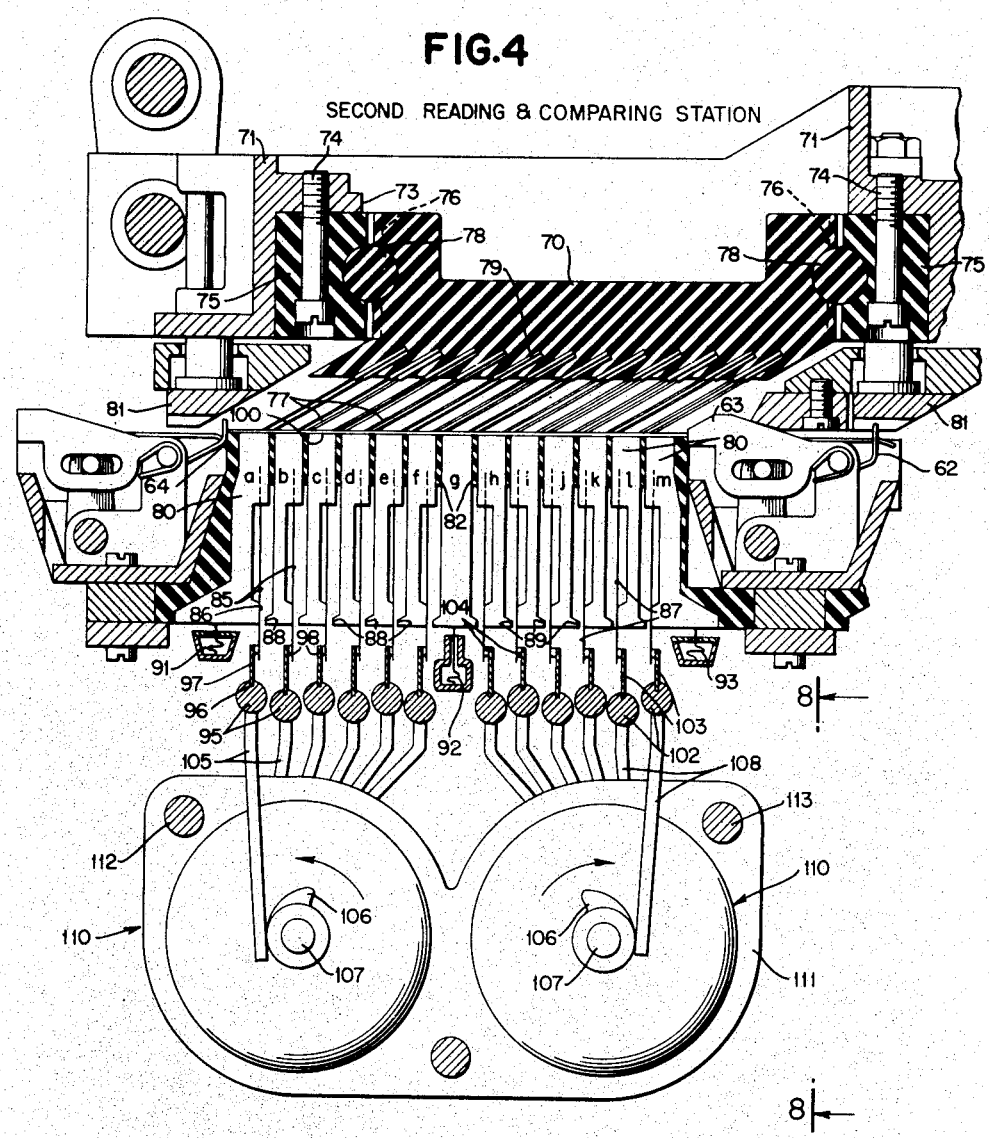
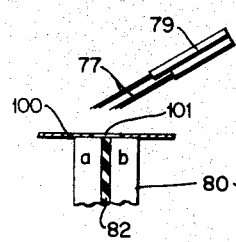
FIG.5
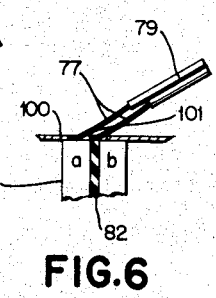
FIG.6
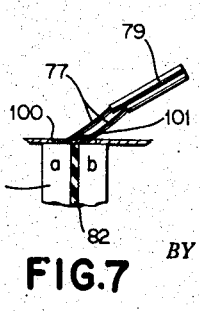
FIG.7
*INVENTOR.*
ROBERT I. ROTH
BY J. W. Lometzer
ATTORNEY

DESIGNATES AN "IBM" TYPE OF CARD

INVENTOR.
ROBERT I. ROTH

ATTORNEY

Nov. 24, 1959     R. I. ROTH     2,914,245
ACCOUNTING MACHINE CONTROLLED BY DIFFERENTLY CODED
CARDS WITH DATA COMPARISON OF SUCCESSIVE CARDS
Filed Dec. 28, 1956     15 Sheets-Sheet 7

INVENTOR.
ROBERT I. ROTH
BY
ATTORNEY

| FIG. 16a | FIG. 16b | FIG. 16c | FIG. 16d | FIG. 16e |
|---|---|---|---|---|
| | | | | FIG. 16f |

INVENTOR.
ROBERT I. ROTH
BY
ATTORNEY

INVENTOR.
ROBERT I. ROTH

Nov. 24, 1959    R. I. ROTH    2,914,245
ACCOUNTING MACHINE CONTROLLED BY DIFFERENTLY CODED
CARDS WITH DATA COMPARISON OF SUCCESSIVE CARDS
Filed Dec. 28, 1956    15 Sheets-Sheet 13

INVENTOR.
ROBERT I. ROTH
BY
J. W. Lommitzer
ATTORNEY

Nov. 24, 1959

R. I. ROTH 2,914,245

ACCOUNTING MACHINE CONTROLLED BY DIFFERENTLY CODED
CARDS WITH DATA COMPARISON OF SUCCESSIVE CARDS

Filed Dec. 28, 1956

INVENTOR
ROBERT I. ROTH

BY J. W. Lornitzer

ATTORNEY

2,914,245

ACCOUNTING MACHINE CONTROLLED BY DIFFERENTIALLY CODED CARDS WITH DATA COMPARISON OF SUCCESSIVE CARDS

Robert I. Roth, Briarcliff Manor, N.Y., assignor to International Business Machines Corporation, New York, N.Y., a corporation of New York Application December 28, 1956, Serial No. 631,250

10 Claims. (Cl. 235—61.7)

This case relates to punched record controlled machines and more particularly to that type in which comparing of successive records can be effected for automatic control purposes, which function is well known in the art.

In the present state of the art punched records have been devised and utilized which are punched according to different codes and different forms of perforations, each having its own inherent advantages and subject to many corresponding disadvantages, and at the present time no punched record has been adopted which is a standard and useful in all types of commercial punched record controlled accounting machines. Among these different types of punched records may be mentioned the conventional 80-column card with rectangular perforations shown in the patent to Lake, No. 1,772,492, the Tauschek type of record shown in British Patent No. 263,748, and various forms of combinational hole records, such as Peirce, Lasker, etc. With respect to these combinational hole records the code varies, such as 0, 1, 2, 4, 8; 0, 1, 2, 4, 7 and almost as many other numerical codes consistent with the types of records shown in the prior art. Up to the present time the accounting machines controlled by these punched records have been devised to be controlled solely by one type of record. This is because the manufacturer of the various forms of commercial machines has adopted his type of record and has produced a line of machines controlled solely by the type of punched record of his own selection. For the proper operation of any of these accounting machines by other forms of punched records for which they were not originally designed to control, structural changes were required to such an extent that it was not commercially feasible to devise a machine to be controlled by more than one type of records. With centralized accounting systems, such as public service bureaus, demands may be made upon such service bureau to carry out statistical operations for different types of records. It is thus with this requirement in mind and other inherent advantages of the present improvement that the present invention has been made.

As is well known statistical operations effected by record controlled machines are carried out under control of records which have been grouped by sorters or collators according to the different classifications. The classified groups may consist of one record or a plurality of records and the groups follow each other in order that at the termination of each group, total taking, summary punching, and other operations may be automatically effected, after the termination of which operations ensue for the next group of records.

In the present type of record controlled machine, record cards which are differently coded control the machine and it is conceivable that one group of records having one code may be followed by one or a group of records having a different code. There is then the problem of detecting the change in group control number of the first differently coded record in the following group.

It is well known that in such automatic group control mechanisms a comparison is made between two records and preferably a comparison between a pair of records analyzed at two reading stations, as in the present machine. This comparison is carried out for each pair of records until the group control comparing mechanism detects a change in group number which automatically signals that fact and initiates a change in machine operation.

By means of the present invention it is possible, to compare a pair of records at the two reading stations even though they utilize different codes and with the present invention it is unnecessary to keep a batch of records having a certain code separate from another batch of differently coded cards. With the present invention groups of cards may be stacked in the supply magazine and interspersed irrespective of their coding and group control operations are carried out exactly as in other prior record controlled machines which are controlled by unitary coded records.

It is then a principal object of the present invention to compare the data in a pair of differently coded records whether such records are physically separate or are record sections of a tape to determine their agreement or disagreement.

A further object is to provide a comparing device which compares each pair of differently coded records to detect a change in classification data.

A further object of the present invention is to provide a data comparing device for differently coded records in which a pair of reading stations is employed, each for reading the classification data of the related one of a pair of records.

A further provision related to the preceding object is to provide a plurality of selectable code conversion means, each of which converts the different codes on the records to a common code in order that comparing operations may be carried out under control of said common code.

It is, therefore, a further broad object of the present invention to convert a pair of records having different codes to a common code for comparison purposes.

Another object of the present invention is to provide electrical means to analyze a pair of differently coded records and convert them to a common digital impulse code for comparison purposes.

A further feature of the invention is to have the differently coded records consist of the conventional "IBM" record and records of the type utilizing a combinational hole code. By way of example, the combinational code on one form of record may be the 0, 1, 2, 4, 8 and the other combinational code record 0, 1, 2, 4, 7.

As is well known, such form of combinational coded records utilizes fewer index point positions for value representing data, enabling doubling of value designation capacity of a standard record. Such combinational coded records are known as duo-deck having an upper and lower deck in each of which data or digital values are expressed by holes in combinations.

It is, therefore, a further object of the present invention to provide means to enable the comparison to be effected between a single deck coded card and a selected deck of a duo-deck coded card, or between selected decks of a duo-deck coded card.

In other words, an object of the invention is to provide means to compare the combinational digit representation in either deck of a duo-deck card with each other or with a single deck of a conventional "IBM" coded card.

A still further object of the invention is to provide selective pluggable means which associates the comparison device with the analyzer for either deck of the duo-deck card and with a single deck card for comparison purposes.

According to the present invention records which are differently coded are automatically fed from a supply magazine to a presensing station where a type-of-code designation is analyzed and related selecting means are set up. Thereafter, the two records to be compared are fed to a pair of reading stations where an analyzer at each reading station analyzes the records and detects, by the presence of perforations therein, the numerical data represented according to the code on the record. Under control of the selecting means the desired code conversion means is selected in order that each analyzer can read out digital impulses in the common code.

These digital impulses which are emitted under control of each analyzer are compared in each order. For example, the digit impulse emitted from the units order of one analyzer is compared with the digit impulse emitted from the units order of the other analyzer and if the numerical digits are the same in the units order for two records, the same digit impulse will be transmitted and an agreement will be ascertained. However, if the digital impulse transmitted by the analyzer under control of a record utilizing one code is different from the same denominationally ordered digital impulse transmitted by the analyzer under control of a record utilizing a different code, then a disagreement will be detected.

As is well known in the art, the agreeing impulse will generally cause the machine to continue with one type of operation whereas detection of disagreeing impulses will cause a variation in the operation of the machine and generally initiate a total taking or summary punching operation.

It is emphasized that the embodiment of the present invention in a record controlled machine for comparing differently coded records for group control purposes is merely an illustrative embodiment of the present invention and should not be regarded as restrictive. The present comparing mechanism may be embodied in other types of machines where such comparing devices are useful, such as sorting machines, collators, etc.

The application of the present invention is very broad and the embodiment therein in other types of machines not specifically mentioned herein is also contemplated. Further, although cards are hereinafter described they are selected as illustrating a convenient form of record, and other types are contemplated, differing in their type of data designation, and the code. The codes referred herein are also illustrative and other codes are within the spirit of the invention.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4 is a transverse sectional view taken through the Second Reading and Comparing Station showing the detailed construction of the same card analyzer utilized for all the three different types of coded cards illustrated herein.

Figs. 5, 6 and 7 are detail views showing the manner of making brush contact through a hole in the card with a related pair of contact members.

Figure 12:
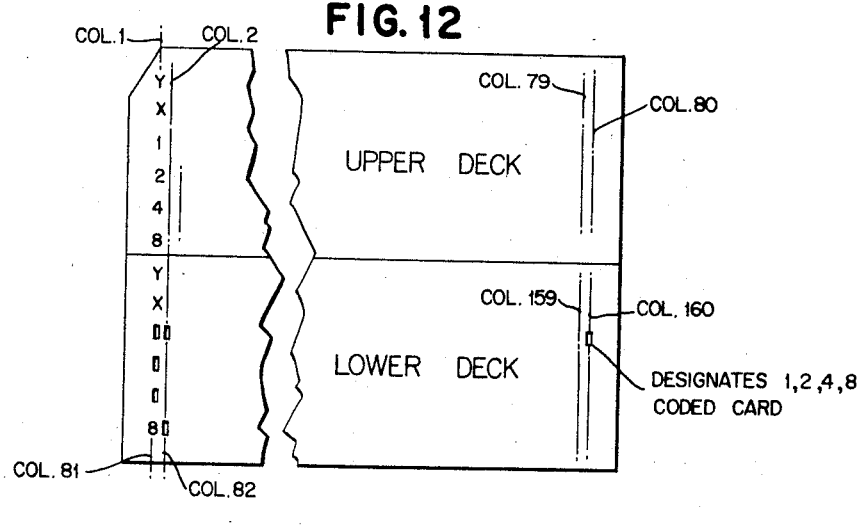

Fig. 12 is a fragmentary view of a double deck combinationally coded card utilizing the code 1, 2, 4 and 8 and also showing in column 160 a hole that designates such type of card and selects the necessary code conversion circuits.

Figure 13:
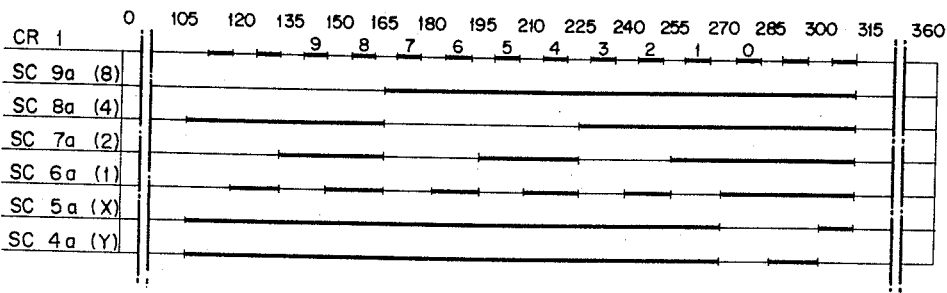

Fig. 13 is a timing diagram of electrical contacts employed in the electrical code conversion circuits when the combinationally coded card of the type shown in Fig. 12 is presented to either reading and comparing station.

Figure 14:
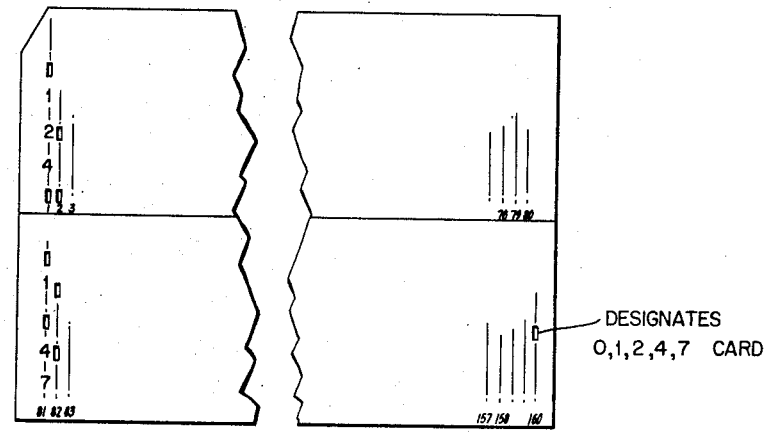

Fig. 14 is a fragmentary view showing a 0, 1, 2, 4, 7 type of combinationally coded card and illustrates the special designation in column 160 for selecting the appropriate code conversion circuits of the machine.

Figure 15:
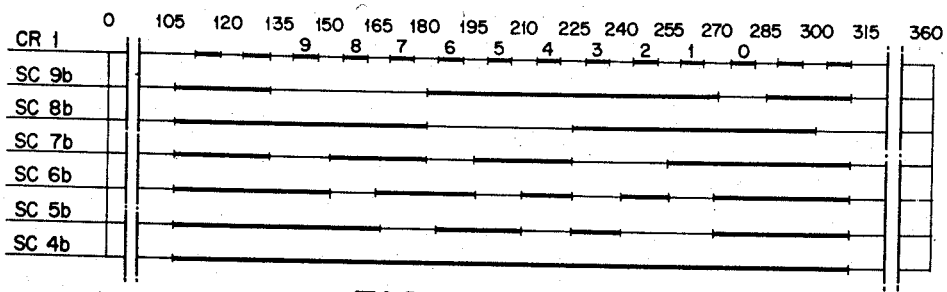

Fig. 15 is a timing diagram of cam contacts employed in the code conversion circuits for the type of combinationally coded card shown in Fig. 14.

Figs. 16a–16f inclusive comprise an electrical circuit diagram of the machine.

Figures 16A, 17:
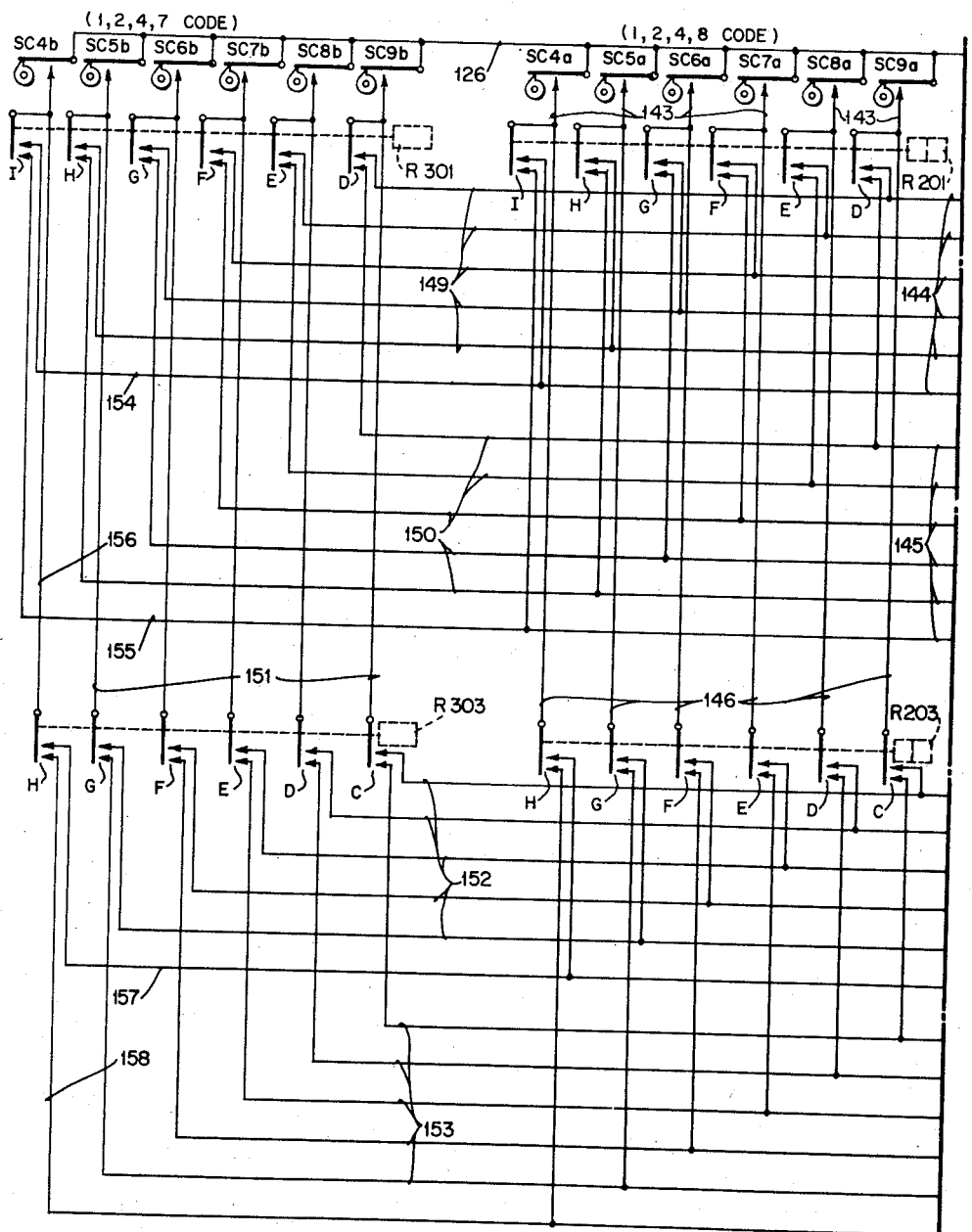
Figure 16B:
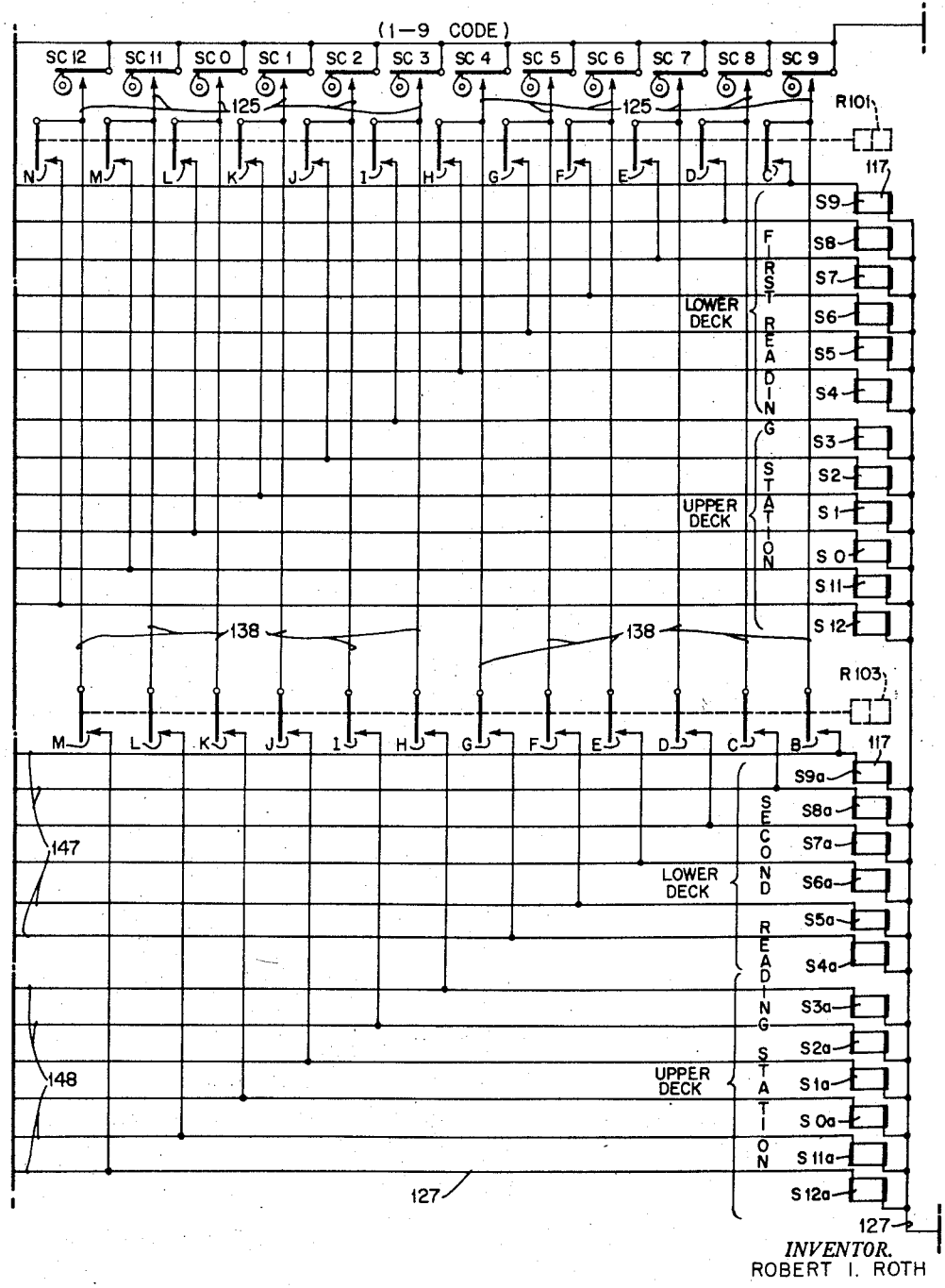

Fig. 17 is a diagram showing the manner of assembling the sheets of Figs. 16a–16f of the electrical circuit.

Figure 18:
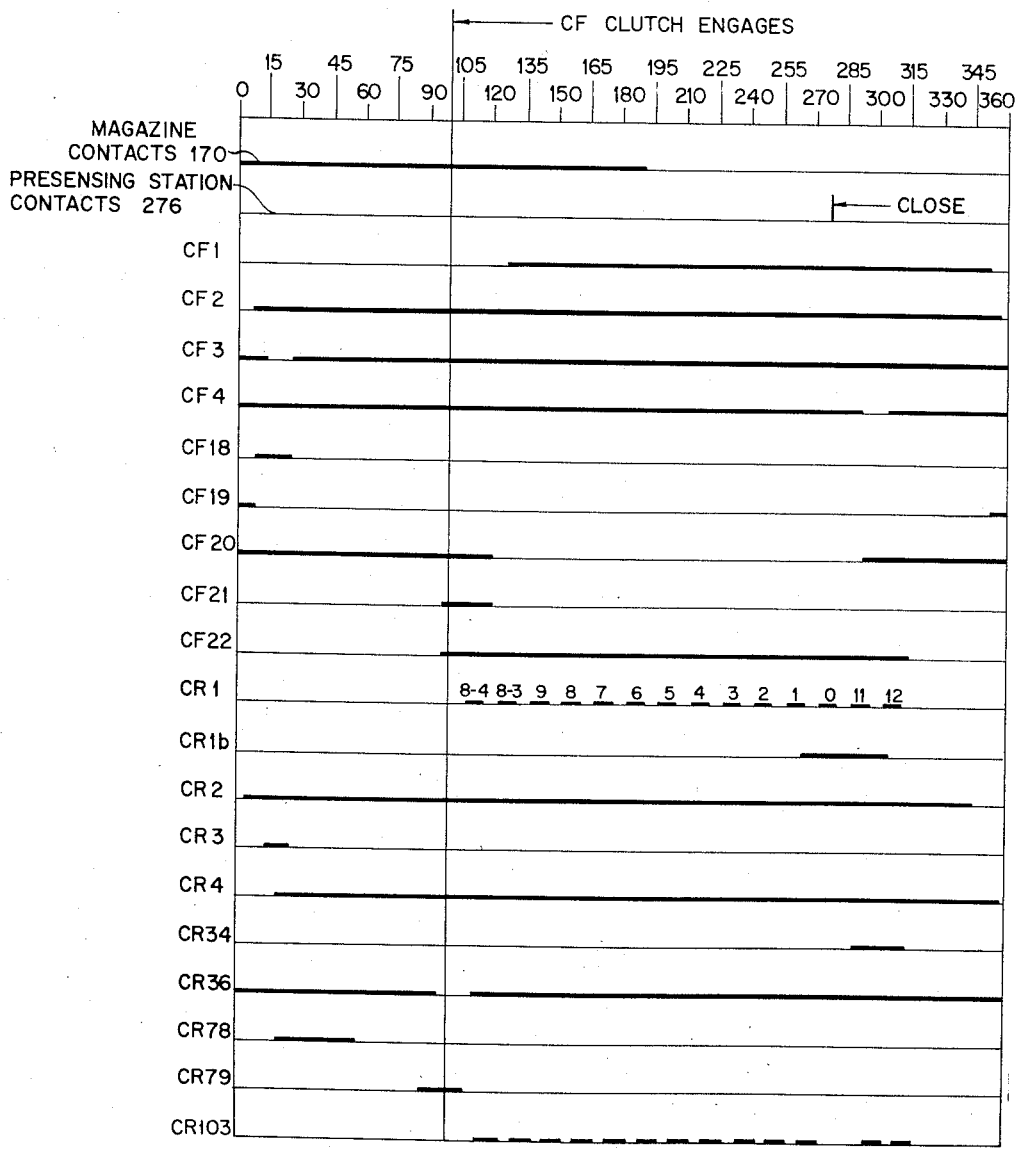

Fig. 18 is a timing diagram of the cam controlled contacts utilized in the circuit diagram of Figs. 16a–16f.

Figure 19:
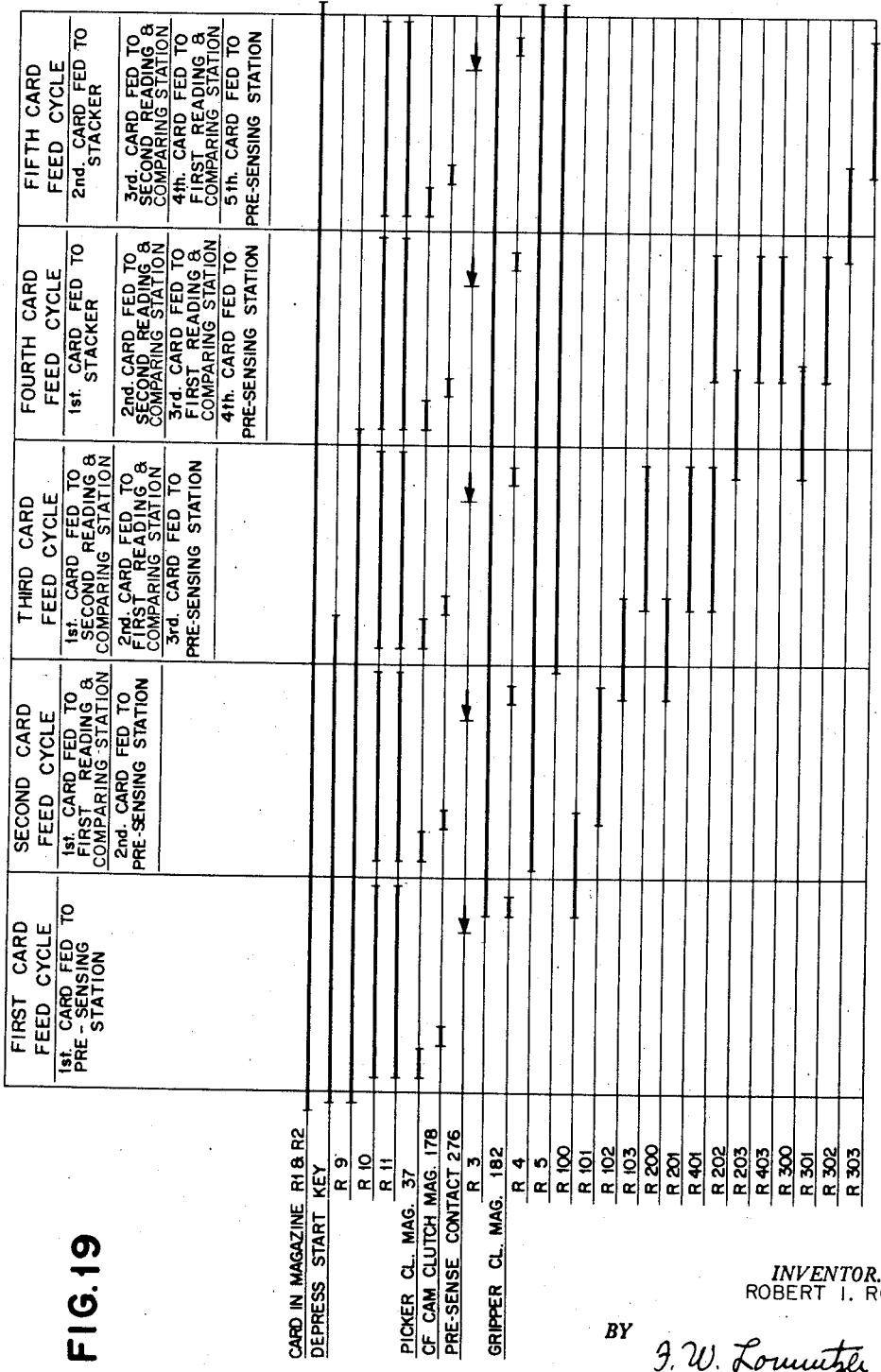

Fig. 19 is a sequence diagram showing the sequence of events in successive cycles of the machine and said diagram also shows the time of energization of the relays for five representative card feed cycles.

*Card storage hopper*

The card storage hopper 23 (Fig. 1) comprises a base plate 21 and two slotted side plates 22, each of which is pivoted on a stacker drum shaft 24. The card storage hopper 23 receives cards fed by a stacker drum 25 after such differently coded cards have passed through the machine to be analyzed and compared in a manner according to the present invention.

*Card supply magazine*

Suitable side plates 26 (Fig. 1) together with a back plate 27 provide a card supply magazine 28 from which differently coded cards are fed singly for their presentation to the different reading and comparing stations.

*Card feed from supply magazine*

A conventional card picker is provided to feed cards singly from the supply magazine and includes a card picker 29 (Fig. 1) having a swivel mounting on a slidably mounted rack 30, all of which parts are carried by the lower section of the card feeding unit. Said rack 30 is operated by a segment arm 31 secured to a rocker shaft 32. To the rocker shaft 32 there is secured a depending arm 33 which has a link connection 34 to an arm 35 secured to a rocker shaft 36.

Figure 2:
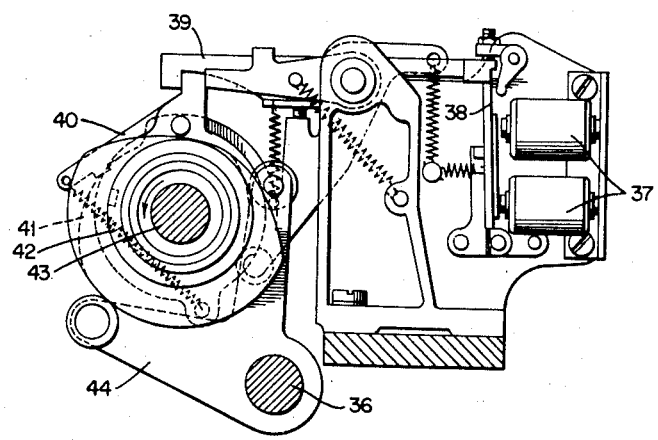
Fig. 2 is a detail view of an electromagnetically controlled card feed clutch.

To effect selective card feed operations there is provided a one-revolution clutch which is controlled by a card feed clutch control magnet 37 (Fig. 2). As in the well known construction the armature 38 thereof rocks a clutch release arm 39 which enables a pawl 40 pivoted on a member to engage a notch formed in a disk 42 secured to the drive shaft 43, which shaft 43 corresponds to shaft 52 in Patent No. 2,514,031. Said member is secured to complementary cams 41 loose on the clutch drive shaft 43. When such clutch engagement is effected shaft 43 will drive the complementary cams 41 a complete revolution. Cooperating with the complementary cams is a follower bell crank arm 44 secured to the rocker shaft 36. Rocking of said shaft by the complementary cams 41 will, through the mechanical linkage just described, reciprocate the picker to feed a card from the magazine.

By electrical circuits to be described later, an impulse is transmitted to the clutch control magnet 37 to cause the clutch engagement and feeding of the lowermost card to the constantly rotating feeding rollers 47, 48. Such rollers feed the card from the beginning of the cycle up to about 200° of the machine cycle to feed the card to the first sensing station, known in the present machine as a "Presensing Station." If a card reaches such presensing station, further card feed operations are effective by grippers so as to feed the card to the First Reading and Comparing Station.

This station is designated a Presensing Station because it has at such station a card operated lever and associated contacts for controlling the ensuing card feed operations dependent upon feeding of a card to this station. The Presensing Station is preferably provided with photocell means to pre-analyze special designations on the card indicating the particular code used for that card for adjusting the machine by selection of the related code conversion circuits.

After the card has been analyzed at both analyzing stations it is received by the stacker drum 25 (Fig. 1) of a conventional construction and since its construction and operation is well known it will only be generally stated that such stacker drum 25 receives a card, turns it over, and deposits it in the card storage magazine 23 and in the same order that the cards are originally stacked in the supply magazine 28.

Card gripping devices

As fully shown and explained in more detail in the patent of G. F. Daly, No. 2,510,559, issued June 6, 1950, cards are positively moved from station to station without the use of the customary feeding rollers and is preferably performed by the use of card gripping devices. Reference has been made to the so-called "Presensing Station" and by a control disclosed in the aforementioned patent the presence of a card at such station enables the closure of the grippers to seize each card at opposite marginal edges and effect reciprocation of the gripper frames to feed the card to the next station or to the stacker drum. The first station has been designated as the "Presensing Station" (see Figs. 1 and 3) the second is known herein as the "First Reading and Comparing Station" which is used for control purposes in a customary card controlled accounting machine and the third station designated as the "Second Reading and Comparing Station," having the function designated by this legend.

In view of the detailed disclosure in the aforementioned Daly Patent No. 2,510,559, it is thought unnecessary to give a detailed description of such card gripping and feeding devices. In general, there is provided at the right side of the card feeding unit in the lower section a reciprocable gripper frame 51R (Fig. 3) carrying card grippers 52, 53 and 54. At the other side of the machine the companion reciprocable gripper frame 51L carries grippers 55, 56, 57. Obviously, from Fig. 3 it will be evident that grippers 52 and 55 feed the card from the Presensing Station to the First Reading and Comparing Station and simultaneously grippers 53 and 56 move a card from the latter designated station to the Second Reading and Comparing Station and grippers 54 and 57 feed a card from the Second Reading and Comparing Station to the stacker drum 25.

When three cards are at their respective stations the concomitant movement of the gripper frames 51R and 51L and their grippers will feed three cards during the same machine cycle.

Each gripper frame 51L or 51R consists of a U-shaped frame carrying ball bearing mounted wheels which roll over a lower track and underneath an upper track carried by the lower side plates of the card feeding mechanism. As previously stated, when cards are to be fed from station to station, the grippers carried by the frames are simultaneously released, that is, they close upon themselves to seize the marginal edge of the card to cause the cards to be fed to the next position as the gripper frames are moved. When the cards are in the next position the grippers are then opened and the gripper frames are returned idly to normal position. The means for closing the grippers and for reciprocating the gripper frames to the left in a card carrying stroke and to the right in an idle stroke is fully shown in the patent to G. F. Daly, No. 2,510,559.

Card stops and aligners for horizontal edges of cards

Also as more fully described in the patent to G. F. Daly, No. 2,510,559, the card feeding unit shown herein is provided with means to align the card along the horizontal edges to accurately correlate the horizontal rows of index points of the cards with the related rows of analyzing brushes.

Figure 3:
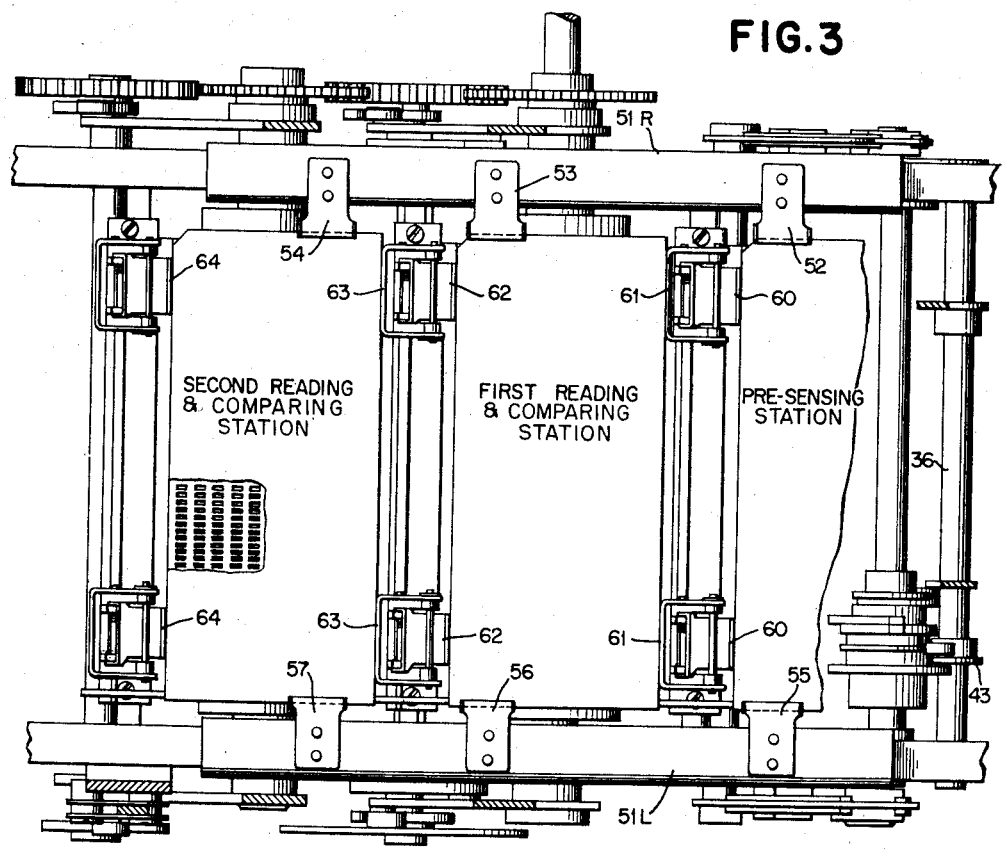
Fig. 3 is a plan view of the card feeding mechanism also showing the successively effective presensing and the first and second reading and comparing stations.

In general, at the Presensing Station the card is aligned between the bight of the feed rollers 47 and 48 (Fig. 1) and two aligners 60 (see Fig. 3). The card at the First Reading and Comparing Station is aligned between card stops 61 and aligners 62 and the card at the Second Reading and Comparing Station is aligned between the card stops 63 and aligners 64.

The card stops 61 and 63 cooperate with the trailing horizontal edges of the cards at the First Reading and Comparing Station and Second Reading and Comparing Station and comprise a bail plate which is urged downwardly against the action of a spring as the card is being fed by the grippers. When the trailing edge passes by the card stops, said stops are spring-urged upwardly to present a square aligning surface to the trailing edge.

The aligners 60, 62 and 64 are, however, movable to the right and upwardly so as to shift the related card to the right to correct the over-feeding of the cards purposely given thereto. As fully described in the aforementioned Daly patent, these aligners are normally below the plane of the cards as they are being fed by the grippers. When the cards have been fed to the respective stations and have been released by the opened grippers, the aligners 60, 62 and 64 are thereupon moved to the right and at the same time upwardly so as to coact with the leading edge of the respective card. This will shift each card to aligned position to accurately align the rows of analyzing brushes with the rows of index points.

Vertical card edge aligners

Also as fully shown and described in the aforementioned Daly patent, the machine is provided with vertical card edge aligners which are disposed at the First Reading and Comparing Station and the Second Reading and Comparing Station. These coact with the vertical or shorter edges of the card so as to shift the card whenever there is any deviation of the card from its proper line or direction of feed. These aligners are not shown herein but it is to be assumed that to accurately analyze the card perforations they are preferably included in the machine and are preferably of the structure shown and described in the aforementioned Daly patent.

Analyzing mechanism

The analyzing mechanism for the perforated records which represent data by different codes is preferably of the type which analyzes the records while they are at rest, and conveniently may be the type shown in the patent to R. E. Page et al., No. 2,484,114, modified as shown in the application of Robert I. Roth, Serial No. 588,838, filed June 1, 1956, now Patent No. 2,807,415.

Such analyzer shown in Figs. 4 to 9 is adapted to analyze not only the 80-column "IBM" type of perforated record shown in the patent to C. D. Lake, No. 1,772,-492, granted August 12, 1930, and Fig. 10 herein but to also analyze combinationally coded cards, either single or double deck, such code being for illustrative purposes the 0, 1, 2, 4, 7 code; the 0, 1, 2, 4, 8 code, or other combinational codes depending upon the desired code selection.

The construction of each analyzer at each reading station is alike and is, therefore, described only for the Second Reading and Comparing Station shown in Fig. 4. In more detail, the analyzing means shown in the aforementioned patent to R. E. Page et al., No. 2,484,114 and the patent of R. I. Roth is provided as shown in Fig. 4 with an analyzing plate 70 for each vertical card column, which analyzing plates 70 are carried by a reciprocable frame member 71 consisting of a single metallic casting. The frame member 71 is formed so as to be capable of holding for each reading station 80 analyzing plates 70 for a corresponding number of vertical card columns. Each analyzing plate or brush carrying unit comprises a plate of insulating material which in thickness is less than the width of a card column and the plurality of brush carrying plates 70 are mounted on the frame member 71 separated from each other. The 80 analyzing plates 70 are mounted so as to fit or pass through a rectangular opening 73 formed in the frame member 71. By means of mounting screws 74 transverse bars 75 of insulating material are carried by the frame member 71 and said bars 75 are formed with slots 76 which receive the analyzing plates 70 in such manner that they are spaced from each other but correlate with the brushes 77 carried by the plates with the index point positions. The analyzing plates are locked in position on the frame member 71 by rods 78 of insulating material which fit in semi-circular cut-out portions formed at the ends of the analyzing plates 70 and along the edge of each insulating bar 75.

Each analyzing plate is provided with inclined slots adapted to receive ferrules 79, each of which carries the respective analyzing brush 77. Brushes 77 are preferably inclined in the direction of card feed and are normally elevated while the cards are being fed to analyzing position. The analyzing brushes 77 are made up of two strands, both of which pass through a hole in the card to make contact with a pair of respective contact members 80.

Figure 11:
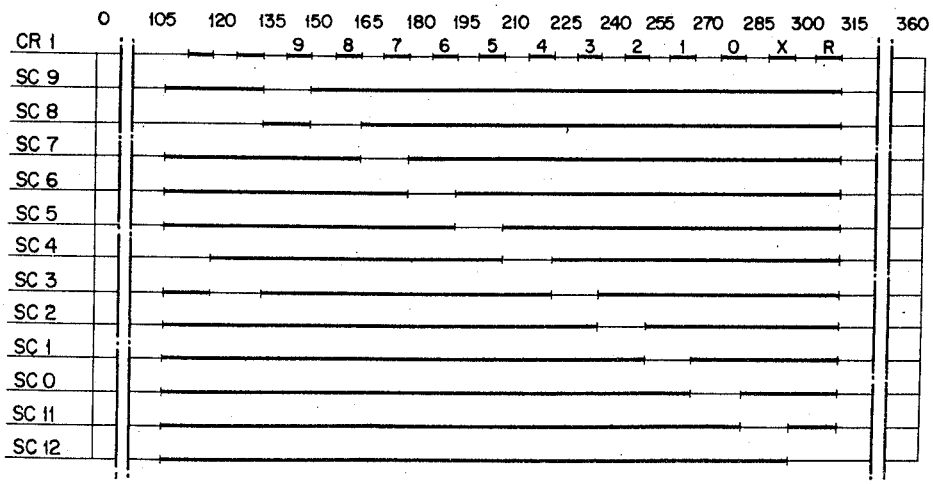
Fig. 11 is a timing diagram illustrating the timing of cam contacts utilized to energize the rotary solenoids for contact bridging or electrical shunting purposes for code conversion circuits for an "IBM" form of card.

The means for depressing the frame member 71 and analyzing plates 70 in a timed operation of the machine may consist of any suitable means, it only being essential that the frame member 71 is in lowered position between 105° and 315° of the timing diagram of Figs. 11, 13 and 15 of the machine cycle during which time test circuits are operable at differential times to determine the pairs of contact members 80 shunted by the brushes 77 and accordingly transmit a digit impulse. The feeding means previously described may be provided for feeding the cards in a successive manner to the analyzing means. Such feeding means feeds a card to the analyzing means so that the latter retains contact with the card during the time the electrical impulses are transmitted and thereafter feed said card out of the analyzing means in order to receive a successive card.

It is desirable to hold the cards stationary during an analyzing operation and to this end the patent to R. E. Page et al., No. 2,484,114 also shows clamping plates 81 which press the card 100 against the surface of the card feeding bed.

The groups of brushes 77 for each of the reading stations are normally up and above the card 100 to be analyzed. When the frame member 71 is initially moved downwardly said brushes 77 are adapted to pass through holes 101 (Fig. 5) when they are encountered or rest upon the top surface of the card.

Figs. 5, 6 and 7 show in detail the analyzing operation. As the frame member 71 is moved downwardly and each dual brush 77 encounters the card 100 as shown in Fig. 5, the lefthand brush passes through the rectangular hole 101 of the card to make contact with contact member 80a, and the righthand brush of the pair rests upon an insulating strip 82 between a pair of contact members 80a and 80b. As the frame member 71 moves further downwardly and slightly to the right as shown by the relative positions in Figs. 6 and 7, the dual brush 77 will be slightly bent, the lefthand brush still making contact with the contact member 80a and the righthand brush of the pair now making contact with the related contact member 80b. It is preferable to employ this form of actuation of the brushes as just described in order to make a firm contact between the brushes and the contact members underneath the card. To this end, it is desirable to employ mechanism in the card feeding mechanism for moving the frame member 71 to effect this mode of operation by employing the construction shown in the aforementioned patent to G. F. Daly, No. 2,514,031, issued July 4, 1950.

However, any other form of analyzing structure will also be satisfactory, provided that upon the passage of the analyzing brushes through the hole in the card they make contact with a pair of contact members and thereby electrically bridge or shunt them.

Figure 9:
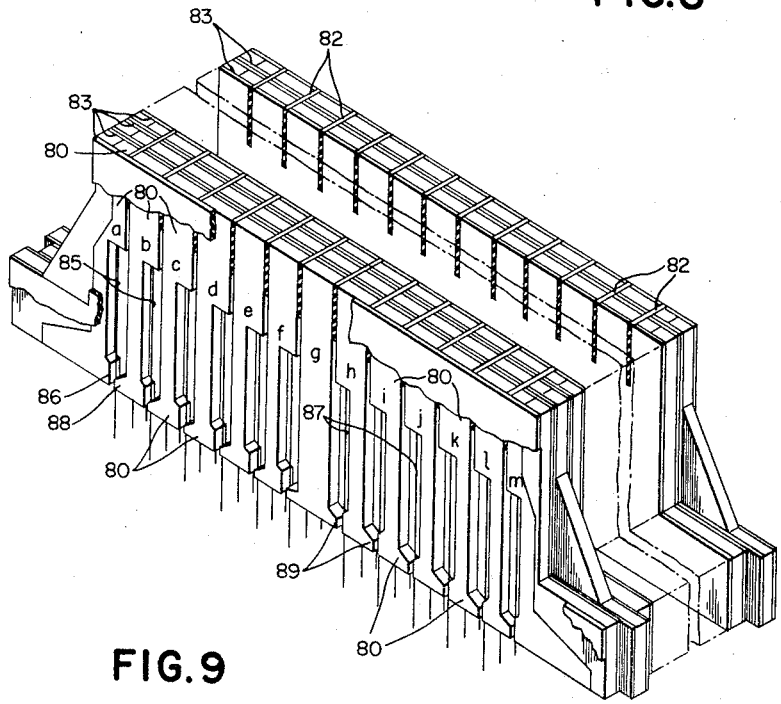
Fig. 9 is a perspective view of the analyzer showing an assembly of several sets of contact members arranged beneath the card so as to form a smooth card bed plate on which the card rests for analyzing operations.

From Figs. 4 and 9 it is evident that for each card column there are provided 13 contact members 80 designated a–m and they are so arranged in pairs that adjacent ones are shunted or bridged by a brush upon the occurrence of a hole. Therefore, it will be seen that with contact member 80a connected to one side of an electrical circuit, the circuit will be continued through contact member 80a, the lefthand brush, the ferrule 79, the righthand brush to contact member 80b upon the occurrence of a hole, and if there is also a hole at the next index point position the circuit will be further continued to contact member 80c. It is obvious, therefore, that at hole positions of a card column, related pairs of contact elements 80 are electrically bridged or shunted. The insulating strips 82 are interposed between the adjacent contact members of each set of 13.

As best shown in Fig. 9 there is provided a set of contact members 80 for each of the 80 vertical card columns of the card. In order to insulate each series of 13 contact members 80 from the adjacent series, there is provided a series of insulating strips 83, best shown in Fig. 9. The 80 series of contact members 80 are adapted to be assembled as shown in the fragmentary view of Fig. 9 and are suitably clamped between the two ends to rigidly retain them in proper position and also to provide at the top a smooth bed plate over which the card may be fed without obstruction.

Fitting in each of the contact members 80a to 80f is a contact wire 85 (Figs. 4 and 9) tensioned so as to normally rest against a foot 86 of the contact member in which a spring wire 85 is fastened. Similarly, contact members 80 h-m have inserted therein similar wires 87 and they too normally rest against the foot 86 of the related contact member. The group of contact wires 85 is adapted to be moved selectively at desired times so that each makes contact with a contact extension 88 of the next adjacent contact member and similarly the contact wires 87 are adapted to be moved to the left to make contact with contact extensions 89 of the contact member 80 next adjacent and to the left. In other words, by selective positioning of the wires 85 to the right, each is adapted to engage the contact member extension 88 of the next adjacent contact member so as to bridge or shunt a pair of members just as the brushes 77 would have done if there was a hole at that particular index point position. In a similar way, movement of the brushes 87 to the right to engage contact extensions 89 of the contact members 80 will bridge or shunt other pairs of contact members 80 just as other brushes 77 would have done if there were holes at these index point positions. Hence, it is possible by selectively positioning the wires to shunt or bridge contact members 80a—b, 80b—c, 80c—d, 80d—e, 80e—f and 80f—g. Correspondingly, the following pairs of contact members may also be bridged or shunted: 80g—h, 80h—i, 80i—j, 80j—k, 80k—l and 80l—m.

Hence, it is evident that bridging of the contact members 80 at the left is effected by positioning of spring wires 85 to the right and bridging of contact members 80 at the right is effected by the positioning of the spring wires 87 to the left. In order to make electrical connections to contact members 80a, 80g and 80m, there is connected to the respective contact members spring terminal wires 91, 92 and 93. For a card of the single deck type, such as a conventional "IBM" card, the test circuit is between terminals 91 and 93, whereas for the duo-deck type card the test circuit for the upper deck is between terminals 91 and 92 and for the lower deck between terminals 92 and 93.

For positioning the spring wires 85 to the right there is provided a series of rock shafts 95, each having a groove 96 in which is fitted a plate 97 carrying an insulating plate 98 which arrangement runs parallel to the long direction of the card so that each insulating plate 98 may, when rocked clockwise, shift 80 spring wires 85 all at the same time so as to effect the desired bridge or shunt between adjacent contact members. This arrangement is duplicated for the wires 87 and consist of a series of rock shafts 102 carrying plates 103 and which latter carry insulating plates 104 adapted when shafts 102 are rocked counterclockwise to move each series of 80 contact wires 86 to the left so as to bridge or shunt adjacent contact members.

As will be clearer later on from a description of the circuit diagram, it will be seen that initially in accordance with the holes in the card certain pairs of adjacent contact members are retained shunted by the brushes when there is a hole at respective index point positions. One or more pairs of contact members may be shunted for each vertical card column in accordance with the number of holes therein. There then remains the necessity of bridging or shunting those contact members which have not been shunted by the brushes 77 and which is, in accordance with the construction of the present analyzer, effected by the spring contact wires 85. The remainder are bridged or shunted at differential times depending upon the contact members initially shunted. This differential bridging or shunting of the remaining pairs of contact members 80 enables the transmission of a differentially timed electrical impulse. For shunting or bridging the remaining pairs of contact members 80, it will be recalled that shafts 95 are rocked clockwise and shafts 102 counterclockwise and each of said shafts may be rocked by any suitable means and herein it is effected by means of rotary solenoids of a construction now to be explained in detail. Each rock shaft 95 has a depending cam follower 105 urged by a series of spring wires 85 against a cam 106 secured to a rock shaft 107. Similarly, the rock shafts 102 have follower arms 108 rocked by their respective cams 106 secured to the rock shaft 107 of the respective rotary solenoid. The preferred construction of each rotary solenoid 110 is best shown in Fig. 8.

For supporting each of the series of rotary solenoids 110, there is provided a mounting plate 111 for each two solenoids as shown in Fig. 4 and which is supported by fixed rods 112 and 113.

Figure 8:
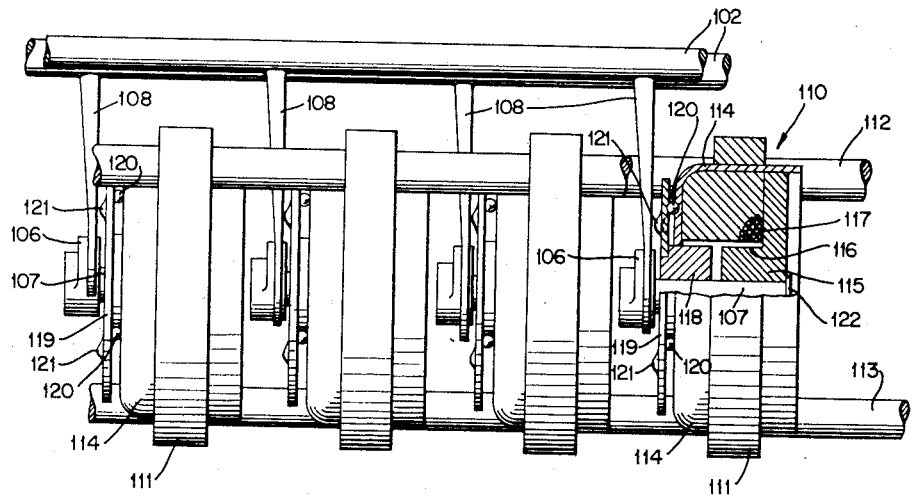
Fig. 8 is an end elevational view taken on the line 8—8 of Fig. 4 showing an assembly of the rotary solenoids and one of them fragmentary to show the general construction.

As is best shown in Fig. 8 the support plate 111 is suitably apertured so as to receive the enclosing casing 114 of the rotary solenoid. Said casing is enclosed at one end by an annular disk 115 apertured to receive the shaft 107 and to allow a slight reciprocating movement therein. The enclosing casing and a shoulder 116 of the annular disk 115 provides a recess for the doughnut type solenoid winding or electromagnetic coil 117 of the rotary solenoid. Fixed to the shaft 107 is a disk 118 attached to which is an armature disk 119. Said armature disk is adapted when the electromagnetic coil 117 is energized to be attracted to the right. The outside of the casing 114 is notched to receive balls 120 which are three in number and said balls coact with the respective inclined notch 121 formed in the armature disk 119. It is obvious, therefore, when said electromagnetic coil 117 is energized it will attract its armature disk 119 and by the coaction of the balls 120 with the inclined cam notch 121, said armature disk will be rotated slightly and since the shaft 107 and cam 106 are connected to the armature disk said cam 106 will be rotated to rock the respective shaft 95 or 102 in the proper direction. Upon the deenergization of the coil 117 said armature disk 119 is restored by a coil spring 122 or other suitable means, thereby rocking shaft 107 in the reverse direction. Rocking of shaft 107 rocks the related rock shaft 95 or 102, thereby moving the respective contact wires 85 or 87 to bridge or shunt pairs of contact members 80.

There will now be explained in connection with the wiring diagram the mode of operation of the analyzer and related emitter circuits to understand how three differently coded cards may be analyzed and converted to differentially timed electrical impulses for the purpose of comparing data on successive cards.

*Mode of analyzing and digit transmitting operations for "IBM" 80-column punched cards*

Upon an occurrence at either reading station of a conventional "IBM" punched card shown in the patent to C. D. Lake, No. 1,772,492 and in Fig. 10 herein, the sensing of a special hole designating this type of card at the Presensing Station selects code conversion circuits to cause the related analyzer to transmit digit impulses in a common code in accordance with the numerical representing holes on the card. These code conversion circuits energize coils 117 of the rotary solenoids 110 at differential times so that they operate the rotary solenoids to cause the bridging of those contact members 80a—m which have not been bridged by the brushes 77 passing through the card holes.

Figure 16C:
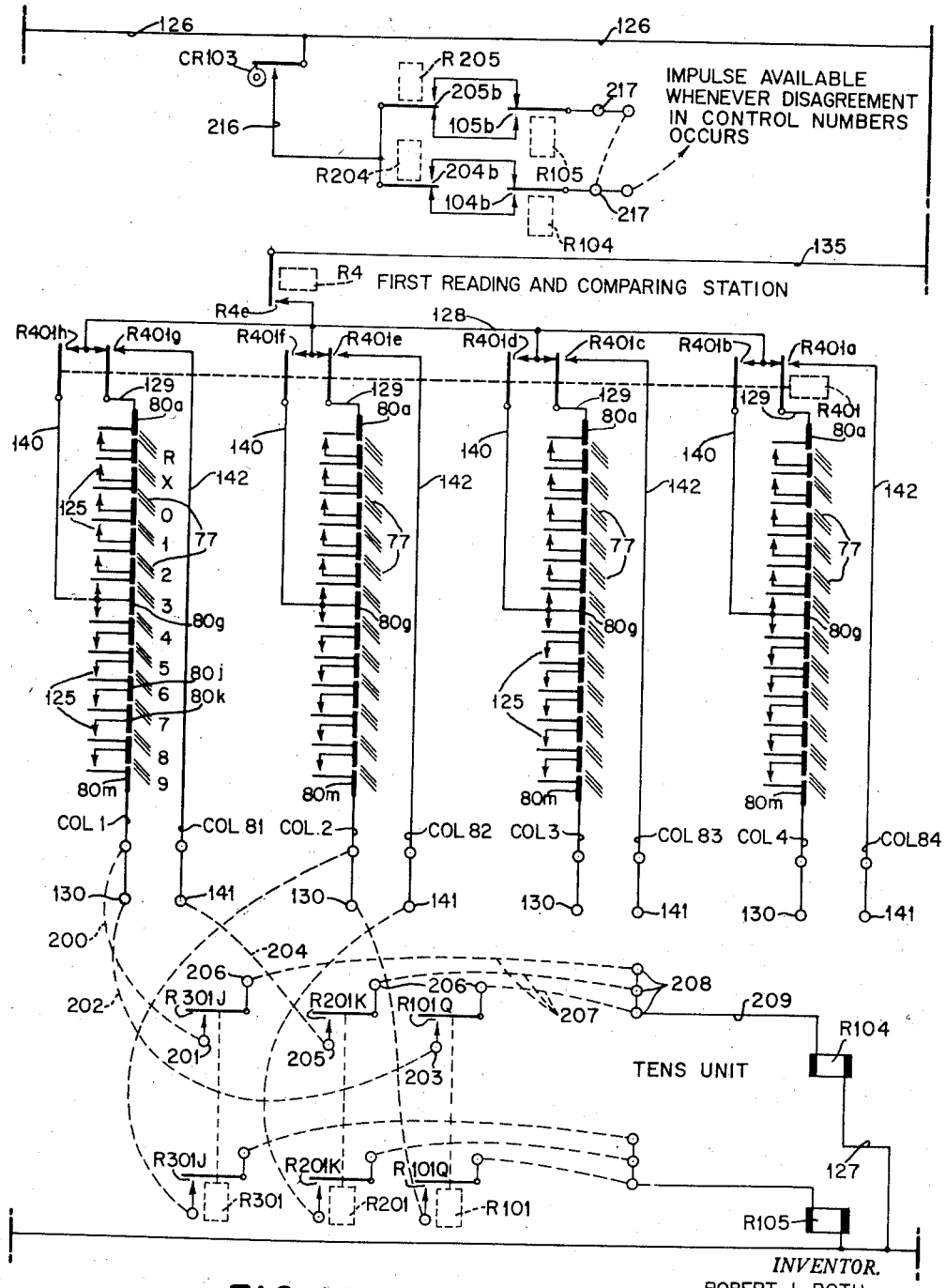
Figure 16D:
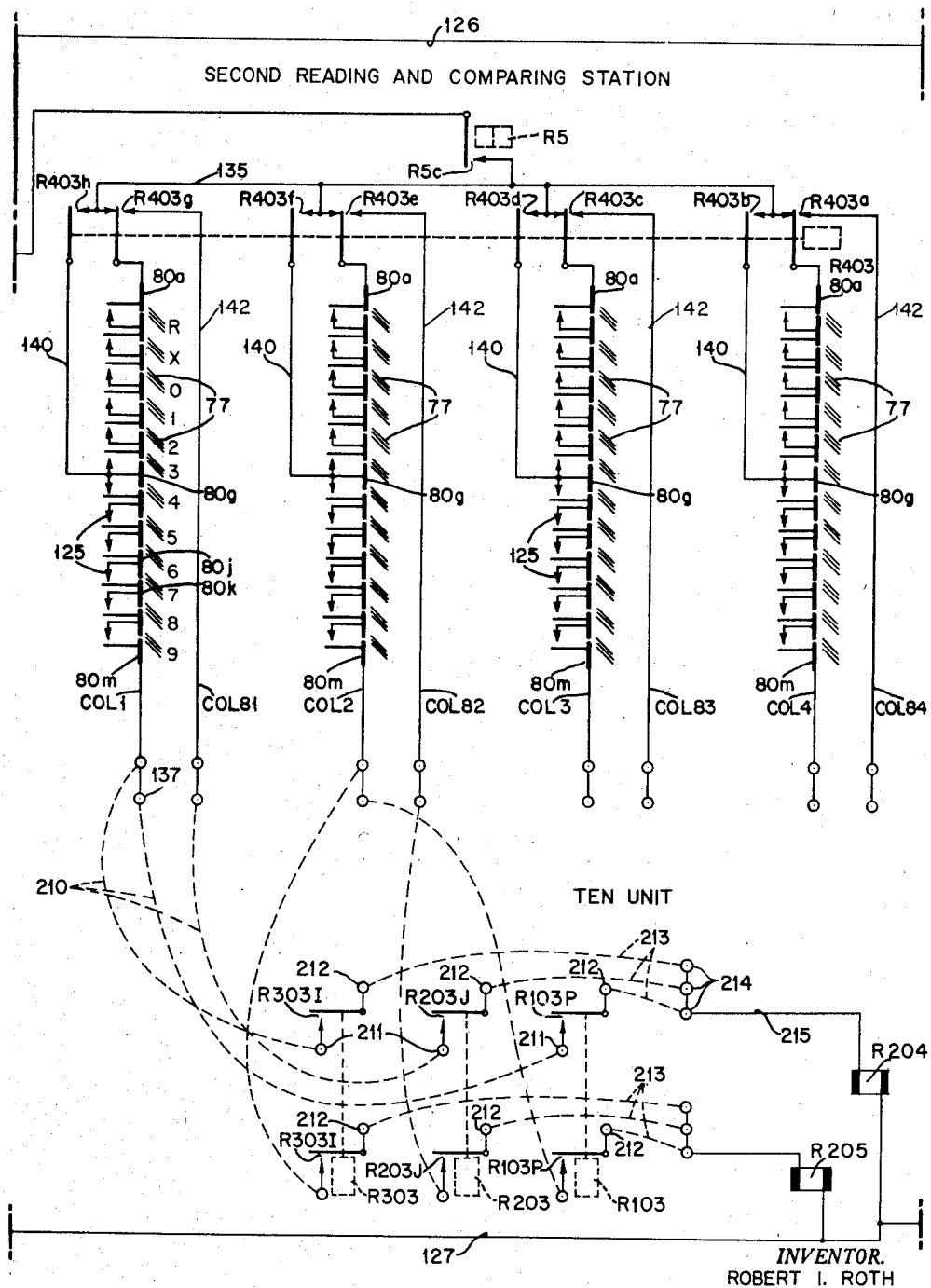

In order to avoid a repetition of the showing of the detailed structural arrangement, the analyzer of Fig. 4 is shown diagrammatically in the wiring diagram of Figs. 16c and 16d for the first and second reading stations wherein it will be seen that each dual strand analyzing brush 77 shunts or bridges a pair of adjacent contact members 80 when such brush passes through a perforation. It will be recalled that at certain times in the operation of the machine the shifting of the contact wires 85 or 87 to the right or left (see Fig. 4) to engage foot portions 88 and 89 of adjacent contact members will, in the same manner as the brush 77, shunt or bridge a pair of the contact members 80. In the wiring diagram of Figs. 16c and 16d this electrical shunting means is shown for simplicity as contacts identified by numeral 125. Reference numerals 126 and 127 represent the electrical supply lines. From the line 126 a circuit is extended through CR1 cam contacts (see Fig. 16c) which have the impulse timing shown in Figs. 11, 13 and 15 and provide the source of differentially timed electrical impulses which are selected according to the brushes 77 which pass through holes in the card.

Upon occurrence of a conventional "IBM" card 100 the sensing of its type of card designation at column 80 (Fig. 10) will, by circuits to be described later, energize a relay R101 (Fig. 16b) to close its series of contacts R101C–N (Fig. 16b), thereby causing the solenoids S9—S0, S11 and S12 or coils 117 of the first reading station to be connected to related cam contacts SC9–0, SC11 and SC12 by wires 125.

The energizing circuit for any of the coils 117 of the rotary solenoids is from line side 126, the related SC cam contact, a wire 125, the respective relay contact R101–C–N closed by relay R101, the related S relay coil or magnetic coil 117 to the line side 127. These cam contacts open and close at different times as shown in Fig. 11 and their timing is so selected as to energize the particular S coils or coils 117 and bridge all the remaining contacts 80 which were not bridged or shunted by the brushes 77.

Figure 10:
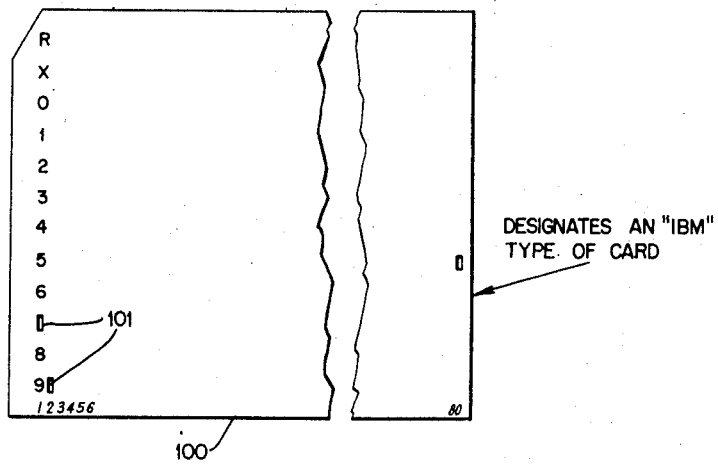
Fig. 10 is a fragmentary view showing the conventional "IBM" type of card showing particularly the manner of perforating two columns to represent an amount "79" and showing the special perforation in column 80 for designating an "IBM" type of card for accordingly selecting the related code conversion circuits for this type of card.

As the S coils or coils 117 are energized in different combinations impulses transmitted by the CR1 cam contacts test the completion of a circuit through contact members 80 by a circuit from the line side 126, through CR1 cam contacts, R4e relay contacts now closed, a wire 128, thence through contacts R401a, R401c, R401e and R401g, now in the normal position shown in Fig. 16c because relay R401 is not energized when a card of the single deck type shown in Fig. 10 is being analyzed, thence by a respective wire 129 to each of the contact members 80a for the four orders shown. The circuit then leads for each order through the contact members 80a–m which are bridged or shunted either by the brushes or the contacts 125 effected by the coils 117 of the rotary solenoids, thence from the final contact member 80m to a plug socket 130. Electrical circuits are shown for only four denominational orders for the first and second reading and comparing stations, it being obvious that for 80-column cards these are duplicated to the extent of 80 orders to take care of 80 columns of data. Hence, it is obvious that for analysis of the conventional "IBM" statistical card the impulse circuit is completed between contact members 80a to 80m to emit pulses at plug sockets 130.

Assuming now that the card is perforated with the 7 hole in column 1 and the brush 77 at the 7 index point position has bridged contacts 80j and 80k, the remaining contact members 80 will not be bridged. During the machine cycle the CR1 cam contacts transmit digit impulses 9, 8, 7, 6, 5, 4, 3, 2, 1 and 0 (see Fig. 11) and at each of these impulse times cam contacts SC0 to 9 will energize the related coils 117 to thereby bridge or shunt a pair of contact members by the energization of the related coil 117 of the rotary solenoid. At the 7 impulse time CR1 cam contacts transmit an impulse to the contact member 80a. At the same time, referring to Fig. 11, cam contacts SC9, SC8, SC6–0, SC11, SC12 have energized their respective coils 117 of the rotary solenoids so that the remaining contact members between 80–a and 80–m are closed to continue the impulse circuit to the plug socket 130. If, however, the card column was perforated to represent a 2, at the 2 impulse time for the CR1 cam contacts the SC9–3, SC1, SC0, SC11 and SC12 would have energized the respective coils 117 of the rotary solenoids to complete, at the "2" impulse time, the circuit between the contact members 80a to 80m, and a 2 impulse will then be transmitted to the plug socket 130.

The above description has been confined to the impulse circuits for the First Reading and Comparing Station but it will be noted that similarly the analyzer at the Second Reading and Comparing Station may also control digit impulse transmission under control of an "IBM" statistical card analyzed at the Second Reading and Comparing Station. It will be seen that the impulses from CR1 are also extended by a wire 135 (Figs. 16c, 16d), thence through R5c contacts which are now closed, a wire 136, thence through contacts R403a, R403c, R403e, R403g now in normal position, due to the deenergization of the relay R403 because a single deck card is being analyzed, to the contact members 80a for each of the denominational orders at the Second Reading and Comparing Station. Upon completion of the circuit between contact members 80a and 80m in the manner described, impulses appear at plug sockets 137 for the Second Reading and Comparing Station. Similarly, the coils 117 (Fig. 16b) for the rotary solenoids of the Second Reading and Comparing Station which are designated S9a—S0a, S11a and S12a are also energized under control of the respective cam contacts SC9—SC0, SC11 and SC12, it being noted that wires 138 are connected to wires 125, thereby completing the circuit from each wire 138 through the respective R103B–M relay contacts to the related S9a to S0a, S11a and S12a or coils 117 of the rotary solenoids, to the line side 127. Relay coil R103 is energized by circuits to be subsequently described when it has been detected that the card at the Second Reading and Comparing Station is a card of the form shown in Fig. 10. Thus, for the Second Reading and Comparing Station the analyzer and the related impulse circuits also convert the punched card designations of an "IBM" type of card to differentially timed impulses which appear at the plug sockets 137.

*Operation of analyzer and digit emitter circuits for duo-deck 1, 2, 4, 8 coded cards*

The present machine is also adapted to be controlled by duo-deck combinationally coded cards of the forms shown in either Figs. 12 or 14. Upon sensing a special designation in column 160 that such a card is a duo-deck combinationally coded card the impulse circuits are selected to be controlled by the analyzers at either reading station to transmit digit impulses according to the punched holes on the card.

From Fig. 12 it will be seen that the duo-deck card is divided horizontally to provide 80 card columns in the upper deck, the six index point positions from the top to the bottom of the upper deck being Y, X, 1, 2, 4 and 8. A duplicate arrangement is provided for the lower deck in order that columns 81 to 160 may also represent 80 digits. With this arrangement the digit representing capacity is doubled over the "IBM" card. By a coding utilizing the 1, 2, 4, 8 binary combination shown in the table below all of the digits 0–9 may be represented.

TABLE I

9=an 8 perforation plus a 1 perforation
8=an 8 perforation alone
7=a 1 perforation plus a 2 perforation plus a 4 perforation
6=a 2 perforation plus a 4 perforation
5=a 4 perforation plus a 1 perforation
4=a 4 perforation alone
3=a 2 perforation plus a 1 perforation
2=a 2 perforation alone
1=a 1 perforation alone
0=an X perforation plus a Y perforation It will be seen from the above table that the digits 1, 2, 4 and 8 are represented by single holes alone whereas the other digits require combinations of holes. For example, the digit 3 requires a 2 perforation plus a 1 perforation. The analyzer and coordinated impulse transmitting circuits for each reading station are designed to transmit, as shown in Fig. 13, impulses having precisely the same timing as that derived from the "IBM" type of card. The CR1 cam contacts comprise the source of electrical impulses as before, and the circuit for the First Reading and Comparing Station is extended through R4e (Fig. 16c) contacts now closed, and since R401 relay is now energized because a combination hole duo-deck card was earlier detected at the Presensing Station, through either R401*b*, R401*d*, R401*f*, R401*h* relay contacts now closed, wire 140 to the central contact member 80*g* of each order. The circuit sub-divides at this point and may be completed for the upper deck between the contact members 80*a* and 80*g* and for the lower deck between contact members 80*g* and 80*m*. When a column in the lower deck is analyzed the circuit is completed to contact member 80*m*, to a plug socket 130. When a column in the upper deck is analyzed the circuit is completed to contact member 80*a*, through related relay contacts R401*g*, R401*e*, R401*c*, R401*a* now closed, and respective wire 140 to a plug socket 141. Plug sockets 141 are provided for the upper deck and plug sockets 130 for the lower deck. A similar arrangement is provided for the Second Reading and Comparing Station and digit impulses are emitted at plug sockets 137 for the lower deck and plug sockets 230 for the upper deck. By plug connections from these plug sockets digit entering or other operations are controlled.

The manner of transmitting differentially timed impulses from the combinationally coded card of Fig. 12 will now be explained in connection with several examples. The same principle of operation, as previously described, is also embodied in the circuit arrangement of Fig. 16*c*. That is to say, certain of the brushes 77 will bridge or shunt related contact members 80 and by electro-mechanical means previously described contacts 125 will shunt the other contact members 80 to complete an impulse circuit between contact member 80*g* and either contact members 80*a* or 80*m*.

Taking, for example, the desired transmission of the 9 digit impulse which requires a hole at 8 and a hole at 1, it will be noted that brushes 77 at the 1 and 8 index point positions will shunt their adjacent pairs of contact members 80.

At the 9 impulse time in Fig. 13, cam contacts SC8*a*, SC7*a*, SC5*a*, SC4*a* will energize the respective coils S8, S7, S5, S4 or the coils 117 of the rotary solenoids for the lower deck, thereby closing related contact 125 and shunting the remaining 4, 2, X and Y pairs of contact members 80 and thus completing a circuit between contact members 80*g* and 80*m* to produce a pulse at the plug socket 130 of the selected order.

From the above description, it will be possible to easily trace out the manner of transmitting the remaining differentially timed digit impulses, it being noted that the perforations utilized to represent a certain digit effect the shunting of certain of the pairs of contact members 80, and at the time the differential impulses are transmitted the remaining contact members are shunted, due to closure of certain contacts 125 by the energization of the desired coils 117 effected by the related cam contacts SC4*a*—SC9*a*.

The impulse circuit for cam contacts SC4*a*—SC9*a* is from the line side 126 (Fig. 16*a*), wires 143, through contacts 201D–I now closed because R201 relay is, as will be explained, energized as a result of the occurrence of a card coded 1, 2, 4, 8, wires 144 to coils S9—S4 for the lower deck and wires 145 to coils S3, 2, 1, 0, 11, 12 for the upper deck. The above are the energizing circuits for the First Reading and Comparing Station.

It will be seen in Fig. 16*a* that by wires 146 cam contacts SC4*a*—SC9*a* are wired to respective relay contacts R203C–H now closed because R203 relay is energized as the result of the occurrence of a card coded 1, 2, 4, 8. From contacts R203C–H there are two sets of wires 147, 148 to energize the two sets of coils S9*a*—S4*a* and S3*a*—S12*a* for the lower and upper decks of a card analyzed at the Second Reading and Comparing Station.

*Operation of analyzer and digit emitter circuits for duo-deck 1, 2, 4, 7 coded cards*

According to the present invention, the machine may be responsive to a second type of combinational coded card known as the "two-out of five" coded cards because for each digit two holes are utilized. The digits are represented by holes at the 0, 1, 2, 4, 7 index points as shown in Table II below. The coded card is shown in Fig. 14, and as will be seen it is a duo-deck type of card to represent 160 digits in upper and lower decks.

TABLE II

9=a 7 perforation plus a 2 perforation
8=a 7 perforation plus a 1 perforation
7=a 7 perforation plus a 0 perforation
6=a 4 perforation plus a 2 perforation
5=a 4 perforation plus a 1 perforation
4=a 4 perforation plus a 0 perforation
3=a 2 perforation plus a 1 perforation
2=a 2 perforation plus a 0 perforation
1=a 1 perforation plus a 0 perforation
0=a 7 perforation plus a 4 perforation There will now be described the modification of the impulse circuits for causing the emission of 0–9 digit impulses under control of the 0, 1, 2, 4, 7 coded card. These impulse circuits are operative for each analyzer when a 0, 1, 2, 4, 7 coded card appears at either reading station. As stated Fig. 14 shows the form of card, Fig. 15 the timing diagram, and Fig. 16*a* shows the impulse circuits for the 0, 1, 2, 4, 7 card.

The manner of completing the impulse circuits from the CR1 cam contacts through the analyzer at each reading station is exactly the same as for the 0, 1, 2, 4, 8 coded card, the only difference being that the contact members 80*a*–*m* not bridged by the brushes 77 are shunted at times as is required for the 0, 1, 2, 4, 7 coded card, and shown by the difference in the timing diagrams of Figs. 13 and 15. As will be later described, R401 and R403 relays (Figs. 16*c* and 16*d*) are energized so that the analyzer at either reading station may be conditioned by the card itself to be controlled by the 0, 1, 2, 4, 7 coded card. Also relays R301 and R303 relays (Fig. 16*a*) are energized as a result of detecting the presence of a 0, 1, 2, 4, 7 coded card to render the common impulse circuits for the two sets of electromagnetic coils operative for each reading station.

In accordance with this required timing cam contacts SC4*b*—SC9*b* (Fig. 16*a*) will energize respective coils 117 at successive digit impulse transmitting times to close certain of the contacts 125 which are complementary to the brushes 77 which have passed through perforations. The energizing circuit is for cam contacts SC5*b*—SC9*b* from the line side 126, through cam contacts SC5*b*—9*b*, R301, D—H contacts now closed, and for the lower deck of the First Reading and Comparing Station through five wires 149, related five wires 144, S5—S9 coils, and for the upper deck through five wires 150, five related wires 145 to coils S3, S2, S1, S0, and S11 of the First Reading and Comparing Station.

The above description pertains to the First Reading and Comparing Station. For the Second Reading and Comparing Station impulses are directed from cam contacts SC5*b*—9*b* to five wires 151. The impulse circuits then lead through relay contacts R303C–H, five wires 152, five related wires 147 to coils S5*a*—S9*a* for the lower deck and five wires 153 and five related wires 148 to coils S3*a*—S11*a* for the upper deck of the Second Reading and Comparing Station.

Because the code utilizes only five digit positions the 6th index point position remains blank and for proper operation of the circuit the SC4*b* cam contact is adapted through R301I relay contacts and wire 154, or 155 to energize the S4 or S12 coils for the First Reading and Comparing Station. For the Second Reading and Comparing Station there is from contacts SC4*b* a wire connection 156, the circuit then passing through relay contacts R203H, wires 157 and 158 to respective coils S4*a* and S12*a* of the Second Reading and Comparing Station. Cam contact SC4*b* energizes these coils to bridge the contact members at the 6th or blank index point position continuously through the impulse digit transmitting portion of the cycle.

For example, at the 9 digit impulse transmitting time the brushes 77₁ and 77₂ will have bridge their related pairs of contact members 80 through the 7 and 2 holes, whereas the SC8b, SC6b, SC5b, as well as SC4b cam contacts will cause the closure of related contacts 125 to shunt the remaining pairs of contact members 80. Hence, a circuit will be completed between the contact member 80a and 80g for the upper deck to cause a 9 digit impulse to be transmitted to a plug socket 141 or 230, depending upon the reading station involved.

The same mode of operation is carried out for transmitting the remaining digits and can easily be traced out, it being noted that in each case the brushes 77 for the combination of two holes to represent a certain digit, cause the shunting of related two pairs of contact members 80 and the remaining pairs of contact members in the impulse circuit are shunted by the electro-mechanical contacts 125 under control of the selected rotary solenoids energized by the SC4b—SC9b cam contacts.

As described for the 1, 2, 4, 8 combinational hole duo-deck card, when magnet R303 (Fig. 16a) is energized, the six SC4b–SC9b cam contacts also transmit energizing impulses to the two sets of magnets 117 for both the upper and lower decks of the second Reading and Comparing Station. However, which columns are selected for operation is dependent upon the plug wire connections from plug sockets 137 and 230 (Fig. 16d). Also which reading station is utilized is dependent upon which magnet R301, R303 is energized.

*Detection of the presence in presensing station of the various types of coded cards*

Figure 1:
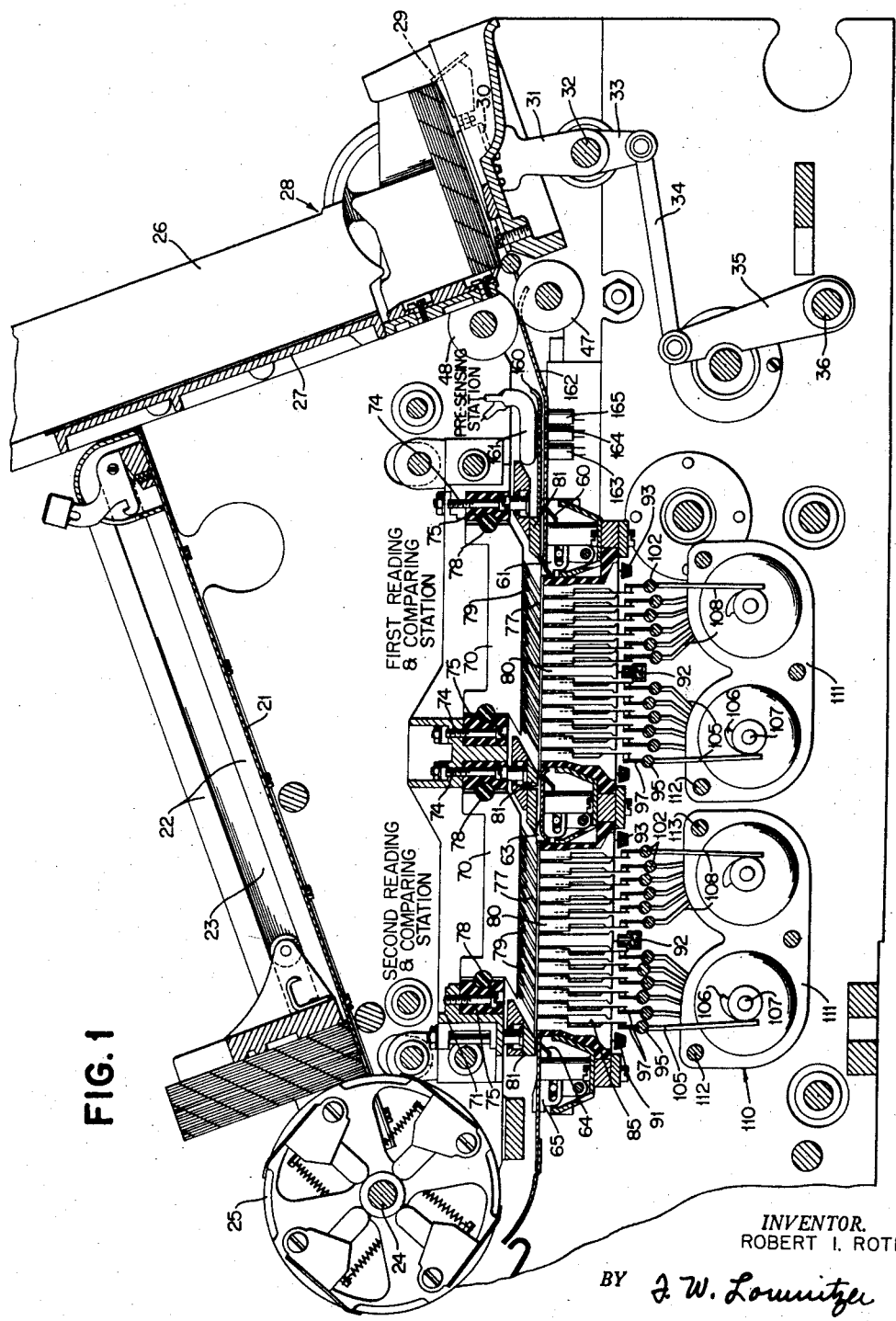
Fig. 1 is a longitudinal sectional view of a card feeding and analyzing mechanism of a well known type, showing the Presensing Station for ascertaining herein the kind of coding used for each card, and showing the adjacent first and second reading and comparing stations for comparing successive cards.

It will be recalled, referring to Fig. 1, that the card magazine is adapted to have therein a series of differently coded cards which may be interspersed or arranged in any desired order. Since the different groups of energizing circuits for the rotary solenoids are selected in accordance with each of the three different types of cards there is preferably a presensing of each card before it enters the First Reading and Comparing Station to determine the type of coded card to select the appropriate group of code conversion circuits.

As best shown in Fig. 1 the upper card guide plate 160 carries a conventional neon or high voltage fluorescent lamp 161 which is tubular in form. Said lamp 161 is arranged to illuminate column 80 of the card shown in Fig. 10 which is correspondingly aligned with column 160 of the coded cards of Figs. 12 and 14 and said lamp 161 is of such length that it can sense the 7, 6, or 5 hole positions of said columns. The upper guide plate 160 is perforated longitudinally so that the light can shine through any of these perforations and activate one of three photocells 163, 164 and 165 attached to the lower guide plate 162.

It is assumed in the present embodiment that a card perforated at the 5 index point position which designates the "IBM" type of card will activate the photocell 163. A card coded 1, 2, 4, 8 is perforated in column 160 (see Fig. 12) at the 6 index point position and such hole will activate the photocell 164. In the same way a perforation in column 160 at the 7 index point position will designate that such card is coded according to 0, 1, 2, 4 and 7 code and thus activate the photocell 165.

As will be made clearer later on, the activation of each photocell conditions certain circuits so that when the card appears successively at the first and second reading and comparing stations the desired group of energizing circuits for the rotary solenoids will be called into operation for the analyzer at the first and second reading and comparing stations.

When the photocell 163 is activated the latter will start a chain of operations so that relay R101 (Fig. 16b) will be energized during the cycle that the "IBM" card of Fig. 10 is being analyzed at the First Reading and Comparing Station and by circuits to be subsequently explained relay R103 (Fig. 16b) will be energized in the next cycle when this same "IBM" card is analyzed at the Second Reading and Comparing Station.

The R101 relay will close its C—N contacts and the R103 relay will close its B—M contacts so that each relay will cause energizing impulses to be transmitted from the SC9—SC12 cam contacts to the rotary solenoids to effect shunting of pairs of contact members for the analyzers at the first and second reading and comparing stations to render said analyzers responsive to the "IBM" form of card.

If a card of the 1, 2, 4, 8 coded type shown in Fig. 12 appears at the "Presensing Station," by circuits to be subsequently explained, the hole at the 6 index point position at column 160 will cause the photocell 164 to be activated and then cause the R201 relay to be energized to close its R201, D–1 relay contacts as the card appears at the First Reading and Comparing Station. As the card appears at the Second Reading and Comparing Station the R203 relay will be energized to close the R203–C–H contacts. Both relays will cause the energization of the rotary solenoids for the analyzers at both the first and second reading stations to render the analyzers responsive to the 1, 2, 4, 8 coded card.

In the same way, if a card of the type shown in Fig. 14 is fed from the supply magazine to the Presensing Station, its type of card designation at the 7 index point position will cause photocell 165 to be activated and by circuits to be subsequently explained the R301 relay will be energized when this type of card is presented at the First Reading and Comparing Station, and the R303 relay will be energized when the card shown in Fig. 14 is presented at the Second Reading and Comparing Station. The relays R301 and R303 close their respective contacts to direct the appropriate impulses to the rotary solenoids to cause the analyzers at either the first or second reading and comparing station to be responsive to the 1, 2, 4, 7 coded card as it appears thereat.

It will then be evident that the selective energization of the relays R101 and R103, R201 and R203, R301 and R303 to perform their functions of selecting the desired group of energizing impulses for the rotary solenoids is determined by the type of coded card presented at the Presensing Station.

*Electrical starting circuits*

The electrical machine starting controls in the present machine are substantially similar to those in the patent to G. F. Daly, No. 2,510,559 and reference may be had to Fig. 16 of this patent. It should be noted that the timing of some of the contacts in Fig. 17 herein is somewhat different from the timing shown in Fig. 15 of Patent No. 2,510,559 in order to carry out certain operations in the present machine.

Assuming now that the motor of the machine is running and cards are placed in the magazine, magazine contacts 170 (Fig. 16e) which are well known in the art are closed by a mechanical member 171 which is actuated by the presence of cards in the magazine. By an obvious circuit, closure of contacts 170 energizes the R1 relay and the R2 relay in shunt therewith. These relays are energized continuously. (see Fig. 19).

Depression of the start key 172 (Fig. 16f) will complete a circuit from the line side 126 through stop key contacts 173a, start key contacts 173b to the R9 relay which closes the R9a holding contacts and the hold circuit is effected by cam contacts CR4 back to the line side 126. With R9b relay contacts now closed closure of CR3 cam contacts during the time CR4 cam contacts are closed will complete an obvious circuit to the R10 relay which closes its hold contacts R10a to hold relay R10 through CR2 cam contacts.

R10 relay closes R10b relay contacts (Fig. 16f, at the bottom) to complete a circuit from line side 126 through R10b relay contacts, wire 174, CR78 cam contacts to the picker clutch magnet 37 which, upon energization, engages the card feed clutch (see Fig. 2) to thereby feed the lowermost card from the supply magazine to the Presensing Station in order that it be determined the type of coded card which is to control the machine.

A branch circuit extends by wire 177 (Fig. 16f, lower right) to the R11 relay coil to the line side 127. R11 relay closes its hold contacts R11a and a hold circuit is completed through these contacts and R10b contacts to the line side 126. The card feed clutch magnet 178 which is similar to the card feed clutch magnet 280 of Fig. 21 of Patent No. 2,510,559 is also energized in the first card feed cycle by a circuit from line side 126 through relay contacts R10b, R4d relay contacts, CR79 cam contacts, clutch magnet 178 to the line side 127.

As a card feeds into the Presensing Station it actuates a card lever 175 (Fig. 16e) to close contacts 276 (which are designated by the same number in Patent No. 2,510,559, see Fig. 3), thereby completing a circuit from the line side 126 through CR34 cam contacts, which cam contacts are closed between 288° and 312° of the first machine cycle at the time that the Presensing Station contacts are closed.

A circuit is then extended by a wire 179, R3 relay coil (Fig. 16f) to the line side 127. R3 relay closes the hold contacts R3a, completing a hold circuit back to the line side 126 through the CF4 cam contacts. R3c relay contacts (Fig. 16f, bottom) thereupon close to complete a circuit from the line side 126, through CR1b cam contacts, R3c relay contacts, R11b relay contacts now closed, to clutch magnet 182 to the line side 126. Said gripper clutch magnet 182 corresponds to the gripper clutch magnet 153 of Patent No. 2,510,559 referring to Figs. 4 and 16.

R3 relay is energized at the end of the first cycle (see Fig. 19) and while cam contacts CF4 are closed CF18 cam contacts (Fig. 16f) close early in the second cycle to complete a branch circuit through R3a contacts, wire 176, CF18 cam contacts, R4 relay coil to line side 127. A hold circuit is provided by R4a relay contacts, CF3 cam contacts, to line side 126. Referring to Fig. 16c the R4 relay closes R4e relay contacts to cause impulses from CR1 contacts to be transmitted to the analyzer at the First Reading and Comparing Station. R4 relay is continuously energized.

When the first card appears at the Second Reading and Comparing Station R5c contacts (Fig. 16d) are closed by circuits now to be described to cause impulses from CR1 cam contacts to be transmitted to the analyzer at the Second Reading and Comparing Station.

At the end of the second cycle (see Fig. 18), cam contacts CF19 close to extend a circuit from line side 126, CF3 contacts (Fig. 16f), R4a relay contacts, wire 166, CF19 cam contacts, R5 relay coil, line side 127. A hold circuit is effective through R5a relay contacts and CF2 cam contacts. The R4 and R5 relays are continuously energized because their hold circuits extend through R2a and R2b contacts, back to line side 126.

*Electrical circuits for detecting type of card and conditioning machine accordingly*

So far it will be seen that in the first card feed cycle, referring to Fig. 19, circuits are completed to feed the lowermost card from the magazine to the Presensing Station. There will now be described the circuits which are effective as a result of sensing the type-of-card designation on the card at the Presensing Station. It will be assumed by way of example that the first card is a conventional "IBM" card having a "5" card type designating hole in column 80, as shown in Fig. 10.

As was previously stated, the coordination of the 5 hole with the photocell 163 (see Fig. 1) in the Presensing Station will cause the latter to be activated.

Figure 16E:
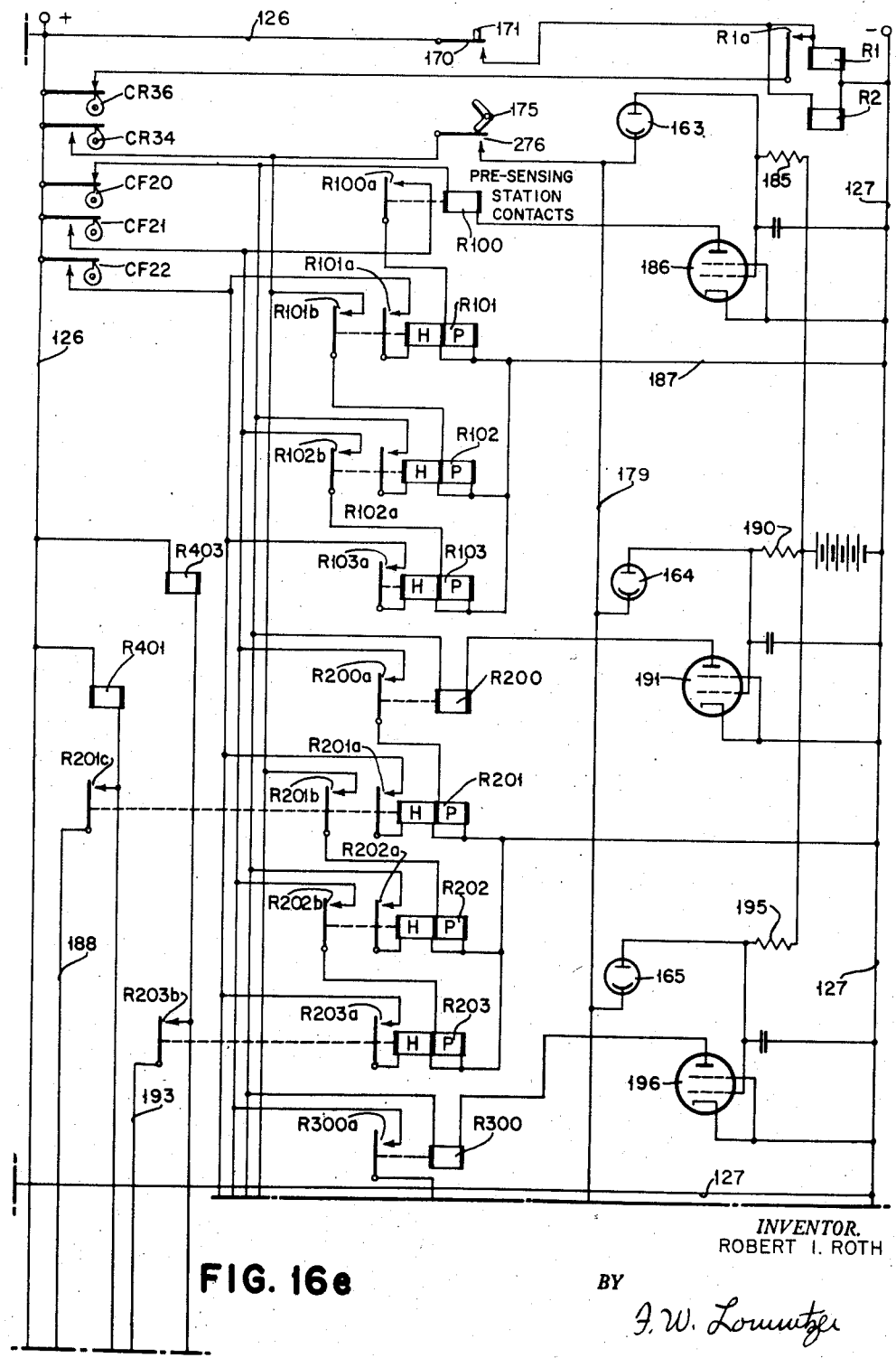
Figure 16F:
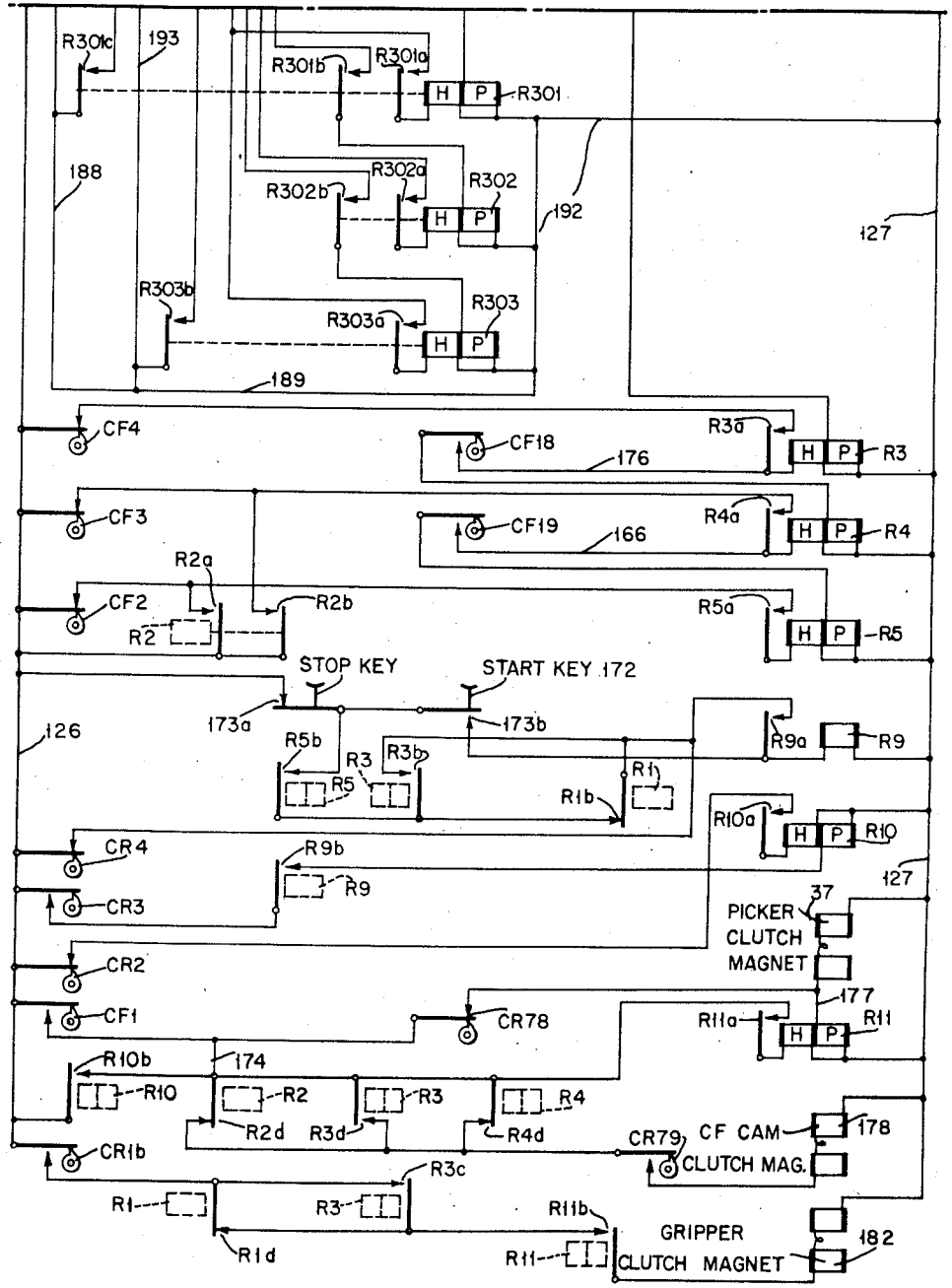

Referring now to Fig. 16e, the illumination of the photocell 163 will cause increased current flow through a resistor 185. When cam contacts CR34 close at the end of the first cycle the control grid of a thyratron 186 is raised to approximately ground potential, thereby causing the thyratron to be conductive. Therefore, when CF20 contacts close at the time CR34 cam contacts are closed, a circuit will be completed to a relay coil R100. Cam contacts CF20 will hold the R100 relay energized into the second machine cycle during which cycle the first card is fed to the First Reading and Comparing Station for analyzing operation and the second card in the magazine is fed to the Presensing Station. Just prior to the time that the analyzer at the First Reading and Comparing Station analyzes the card cam contacts CF21 close, thereby completing a circuit from the line side 126, cam contacts CF21, R100a relay contacts, R101 relay coil to the line side 127. A hold circuit is completed from the line side 127 through R101a contacts and cam contacts CF22. It will be noted then that relay R101 is energized all during the time that the analyzer analyzes the card at the First Reading and Comparing Station. The First Reading and Comparing Station is employed herein for group control and comparing purposes which are to be explained in detail further on since it forms part of the present invention. Cam contacts CF22 are closed between 100° to 315° as shown in Fig. 18 which, of course, is during the time that the digit impulses 9–0 are transmitted as a result of the energization of the rotary solenoids by the cam contacts SC9—SC0, as shown in Fig. 11. It will be remembered that R101 relay closes the C—L relay contacts, thereby causing for digit transmission the energization of the rotary solenoids S9—S0 to be placed under control of the contacts SC9—SC0, respectively.

The operation of the machine with respect to analysis of the type of card shown in Fig. 10 has been previously described in the section designated "Mode of Analyzing and Digit Transmitting Operations for 'IBM' 80-Column Punched Cards." In this respect the circuit for energizing the R4 relay to close R4e contacts (Fig. 16c) to cause CR1 impulses to be transmitted to the analyzer at the First Reading and Comparing Station has been described.

In the type of record controlled accounting machine in which the present invention is preferably embodied, it is desirable to have a second reading station for group control and comparing purposes which is shown diagrammatically in Fig. 16d. At this station the card is reanalyzed and compared with the data on the following card at the First Reading and Comparing Station.

It was also stated that selection of the appropriate impulses to energize the rotary solenoids for the Second Reading and Comparing Station is effected by the energization of the R103 relay (Figs. 16b and 16e) which closes its contacts R103B–N (Fig. 16b) to thereby cause for digit transmission involved herein cam contacts SC9—SC0 to energize the rotary solenoids S9a to S0a of the analyzer at the Second Reading and Comparing Station. The energizing circuits for relay R103 are shown in Fig. 16e wherein it will be seen that the R101 relay closes its contacts R101b so that a circuit is completed through the CR34 cam contacts, R101b relay contacts, R102 relay and a wire 187 to line side 127. R102 relay is energized at the end of the second cycle. (See Fig. 19.) R102 relay closes R102a relay contacts, completing a hold circuit to the line side 127, through the hold coil R102, R102a relay contacts and cam contacts CF20 which holds the R102 hold relay coil energized to the end of the second cycle and part of the third card feed cycle. Said relay coil R102 closes supplemental contacts, R102b, thereby completing a circuit when cam contacts CF21 close to the pickup coil of the R103 relay during the beginning of the third cycle. Said relay closes hold contacts R103a and CF22 cam contacts maintain the energization of the hold coil of the R103 relay during the digit impulse transmitting portion of the third card feed cycle.

Summarizing the above description, upon sensing of a type designation of a card at a presensing station, circuits condition the analyzer in order that the card may be analyzed at the First Reading and Comparing Station and automatically other circuits condition the machine so that the analyzer at the Second Reading and Comparing Station will be operative to analyze this same card in a subsequent cycle.

During the second card feed cycle the second card is fed from the supply magazine to the Presensing Station and it will be assumed that this card is of the type shown in Fig. 12 and has a hole at the 6 index point position of column 160 designating that this card employs the 1, 2, 4 and 8 code. When the "6" hole is coordinated with the photocell 164 (see Fig. 1) light will strike the latter and the illumination of photocell 164 will cause an increased current flow through the resistor 190 (Fig. 16e) when cam contacts CR34 close; thus raising the bias on the control grid of thyratron 191 and permitting it to conduct to energize R200 relay when cam contacts CF20 close. The latter will hold R200 relay energized over to the third machine cycle, at which time cam contacts CF21 will effect the energization of the R201 relay through the R200a relay contacts. The R201 relay is held through its hold contacts R201a and cam contacts CF22, and thus retains the R201 relay energized during the reading portion of the third cycle.

Now, referring to Fig. 16a, R201 relay will close its R201D–I relay contacts, thereby causing the rotary solenoids S9–S12 of the First Reading and Comparing Station to be energized under control of the cam contacts SC4a–S9a. As was previously described, the 1, 2, 4, 8 coded card has two decks and it is therefore necessary to condition the analyzer at the First Reading and Comparing Station to be responsive to both decks so that impulses appear at plug sockets 130 and 141.

It will be recalled that for two-deck card analysis in the First Reading and Comparing Station the R401 relay is energized to close the R401b, R401d, R401f and R401h contacts to transmit CR1 impulses to contact members 80g for each order. (See Fig. 16c.)

The energizing circuit for the R401 relay is from the line side 126, R401 relay (Fig. 16e), R201c contacts now closed, wires 188 (Figs. 16e, 16f), wires 189, 192 to the line side 127. Obviously, R401 relay is energized concurrently with the R201 relay.

The 1, 2, 4, 8 coded card, of course, is subsequently fed to the Second Reading and Comparing Station and accordingly the analyzer at the Second Reading and Comparing Station is automatically conditioned to decode the card of this third type. This is effected when the R201 relay closes the R201b (Fig. 16e) contacts to energize the R202 relay when cam contacts CR34 close. Relay R202 is held through its R202a relay contacts and cam contacts CF20. Said relay R202 closes the R202b relay contacts and the latter in turn cause the energization of the R203 relay which is held through the R203a contacts and cam contacts CR22. Thus, referring to Fig. 16a the R203 relay closes its R203C–H relay contacts and now the rotary solenoids S9a to S12a of the Second Reading and Comparing Station are energized under control of cam contacts S9a–S4a. The R203 relay closes the R203b contacts (Fig. 16e) to complete a circuit from line side 127, R403 relay, R203b contacts, wires 193, 189, 192 (Fig. 16f) to line side 126. R403 relay closes the R403b, d, f, and h relay contacts (Fig. 16d) to condition the analyzer at the Second Reading and Comparing Station to respond to two decks for the 1, 2, 4, 8 coded card. Thus, a card of the type shown in Fig. 12 is successively analyzed at the first and second reading stations in successive card feed cycles. Of course, when the second card is at the First Reading and Comparing Station the first card is at the Second Reading and Comparing Station during the third card feed cycle and hence the two analyzers are capable of concurrently analyzing two different types of coded cards in the same or third card feed cycle. This may not be necessarily the condition since, in the second card feed cycle, the second card fed from the supply magazine to the Presensing Station might have been of the same type as the Fig. 10 card assumed to have been fed in the first card cycle; that is, an "IBM" coded card. In this event since the R100 relay has been de-energized it may again be picked up by the activation of the thyratron 186 and said relay in turn energizing the R101 relay will cause the latter to be effective for rendering the analyzer at the First Reading and Comparing Station responsive to a card of the type shown in Fig. 10. In the same manner, the intermediate relay R102 is energized to energize R103 relay so that this card is then analyzed at the Second Reading and Comparing Station, all in the manner previously explained.

During the third card feed cycle the third card is presented to the Presensing Station during which cycle the first card fed is at the Second Reading and Comparing Station and the second card fed is at the First Reading and Comparing Station. It will be assumed that the third card is of the type shown in Fig. 14 which is a duo-deck card coded according to 0, 1, 2, 4, 7 code and to characterize this type of card the card contains at column 60, if so desired, a type-of-card designating perforation at the 7 index point position. When this card is at the Presensing Station (see Fig. 1) this hole will be coordinated with the photocell 165 and by the lamp shining through such hole photocell 165 will be activated by a CR34 pulse to wire 179. When cam contacts CR34 close the increased current flow through a resistor 195 will permit thyratron 196 to be active. Cam contacts CF20 close at the same time as CR34 contacts to cause the energization of the relay R300. The series of relays R300, R301, R302 and R303 are energized in sequence in the same manner as the other groups of relays in the 100 and 200 series and, therefore, only a general description will be given of the circuits and the functions controlled by each relay. R300a contacts close to pick up R301 relay (Fig. 16f) which holds through its R301a contacts so that during the fourth card feed cycle closure of contacts R301D–I (Fig. 16a) will cause impulses from cam contacts SC4b–SC9b to energize the rotary solenoids S9—S0 of the First Reading and Comparing Station to analyze the 1, 2, 4, 7 coded type of card shown in Fig. 14. It will also be noted that the R301 relay closes the R301c relay contacts (Fig. 16f) to pick up the R401 relay so as to condition the analyzer at the Second Reading and Comparing Station to be responsive to a double deck card.

The R301b contacts close to pick up the intermediate relay R302 which closes its contacts R302b and the latter in turn pick up the R303 relay which is energized during the fourth card feed cycle. The R303 relay closes its contacts R303C–H (Fig. 16a) so that cam contacts SC4b to SC9b transmit impulses to the rotary solenoids S9a—S0a of the Second Reading and Comparing Station. R303b contacts (Fig. 16f) also close to energize the R403 relay which closes its contacts R403b, d, f and h at the Second Reading and Comparing Station to enable it to be responsive to a duo-deck type of card.

Thus, referring to Fig. 19 successive card feed cycles ensue, it being noted that during the fourth card feed cycle there are two cards at the two reading stations, a card at the Presensing Station, and at this time the first card will be fed to the stacker.

In the fifth card feed cycle the same conditions occur, it being noted that the fifth card is now fed to the Presensing Station. It is immaterial as to the type of card fed for this card feed cycle, since it may be any of the three types; and in accordance with the type-of-card designation the analyzers will be conditioned as the card is presented at the first and second reading stations to condition the analyzers thereat to analyze this type of card.

So far the description has been confined to the feeding of cards of different type and their analysis at the different reading stations with only a general reference to the particular operations which may be effected at each of the reading stations. It is evident from recourse to Figs. 11, 13, and 15 that the same timed digit impulses in a common code are transmitted as a result of the analysis of the three different coded cards which enables the cards to be compared to determine whether the data on successive cards is alike or dissimilar.

*Means for comparing a pair of differently coded records*

With the present arrangement it is possible to compare data or digital values in selected card fields of a pair of differently coded records to determine whether such data or digital values are in agreement or disagreement. The usefulness of such comparing arrangements is well known in the art and a specific application would be comparing of successive groups of differently coded cards for automatic group control purposes. While this application is disclosed herein it is not specifically limited to this purpose and the improvement may find other applications as well.

It is possible with the present improvement to determine the agreement or disagreement of digital values or other data in any of the three types of cards shown in Figs. 10, 12 and 14, whether such cards appear together in pairs of the same code or together in pairs of any two different codes. Since the sequence in which these coded cards may be fed from the supply magazine is variable, the machine is automatically conditioned to cause the comparing operations for each pair of coded cards to ensue, irrespective of the type of code involved.

It will be assumed that comparing operations may be governed or controlled by two card columns merely for illustrative purposes and that the number to be compared appears in columns 1 and 2 of the type of single deck card shown in Fig. 10; in columns 81 and 82 in the lower deck of the type of card shown in Fig. 12 and in columns 1 and 2 in the upper deck of the type of card shown in Fig. 14. Since the card field consists of two card columns the purpose of the comparing device is to determine whether the digital values expressed in the units and tens column of the card at the First Reading and Comparing Station correspond with the digital values expressed in the units and tens card columns of the card at the Second Reading and Comparing Station. It will be also assumed that the group number to be compared is 79 and therefore each of the cards in Figs. 10, 12 and 14 is shown perforated to represent 79 according to the code of that type of card.

For the above example the plugging connection for the tens column of the First Reading and Comparing Station consists of a plug connection 200 (Fig. 16c) from plug socket 130 of column 1 to a plug socket 201, a second plug connection 202 from the plug socket 130 of column 1 to a plug hub 203 and a plug connection 204 from the plug hub 141 of column 81 of the lower deck to a plug hub 205. Of course, the plug connections can be varied according to the columns or decks which are to be used for comparison purposes. It will then be obvious that differentially timed digit impulses appearing at plug hubs 130 and 141 are transferred by their plug connections 200, 202 and 204 to the plug hubs 201, 203 and 205, respectively. The relays R101, R201 and R301 have respective contacts R101Q, R201K and R301J connected between the plug hubs 203, 205 and 201 and respective plug hubs 206. From said plug hubs 206 there are respective plug connections 207 to multiple connected plug hubs 208, and from said multiple plug hubs 207 there is a single wire connection 209 to the pickup coil of comparing relay R104 which is connected to the line side 127. It has been explained how the digit impulses for the three differently coded cards are read out in a common code from the analyzer to cause said digital impulses to appear, in the assumed example, at three plug hubs 130 and 141. Furthermore, in accordance with the code of the record analyzed at the First Reading and Comparing Station the R101, R201 and R301 relays close their respective Q, K and J contacts to cause said impulses to extend to the plug hubs 206 and by a plug connection 207, plug hubs 208, and the wire 209, energize the comparing relay R104 at differential times.

Assuming, for example, that a card of the Fig. 10 type of code appears at the First Reading and Comparing Station, the digit hole at the 7 index point position of the tens column of the group number 79 causes a 7 digit impulse to be transmitted to the plug socket 130 of column 1 of the upper deck and thence by plug connection 202, plug hub 203, R101Q relay contacts, plug hub 206, plug connections 207, plug hub 208, wire 209 to the R104 relay to energize the latter at the 7 digit impulse time. However, if a card of the type shown in Fig. 12 appears at the First Reading and Comparing Station and is perforated according to the 1, 2, 4, 8 code to represent 7 by perforations at the 1, 2 and 4 index positions in column 81 of the lower deck, a 7 digit impulse will appear at plug hub 141 of column 81. By the plug connection 204, plug hub 205, R201K relay contacts, plug hub 206, plug connection 207, plug hub 208, wire 209, a differentially timed 7 impulse will be transmitted to the R104 relay.

Further, if the card at the First Reading and Comparing Station is of the coded type shown in Fig. 14 and is perforated at column 1 of the upper deck at the 7 index point position to represent the 7 digit in the tens order, the 7 impulse is transmitted from the plug hub 130 for column 1, plug connection 200, plug hub 201, R301J relay contacts now closed because the presence of a Fig. 14 type of coded card causes the energization of the R301 relay, plug hub 206, plug connection 207, plug hub 208, wire 209, to the R104 relay to cause the latter to be energized at the 7 digit impulse time.

Summarizing, it has been demonstrated that irrespective of the code of the card analyzed at the First Reading and Comparing Station the desired plug connections for selected columns of selected decks cause the digital impulses to effect the energization of the R104 relay at differential digit times under control of perforations in the tens column of the card. Since, for comparing operations, it is necessary to compare said digital values in the tens column of the card appearing at the First Reading and Comparing Station with the digital values represented in the tens column of the card appearing at the Second Reading and Comparing Station, a similar relay comparing circuit is provided for the Second Reading and Comparing Station. Three plug connections 210 (Fig. 16d) are made for columns 1 and 81 to three plug hubs 211 which extend the readout digital impulses through R301I, R203J, R103P relay contacts in the tens order to plug hubs 212, plug connections 213, multiple plug hubs 214, thence by a wire 215 to the comparing relay R204 which is connected to the line side 127.

By the selective energization of the R103, R203 and R303 relays according to the code of card analyzed at the Second Reading and Comparing Station the R204 comparing relay will be energized precisely as explained for the First Reading and Comparing Station. Hence, it is thus possible by detection of simultaneous or dissimultaneous energization of relays R104 and R204 to compare and determine agreement or non-agreement of the digit values in the tens column of a pair of the same or differently coded cards at the first and second reading and comparing stations.

It is desirable to have the comparing device extended for control by data in more than one column. Accordingly, the units column of the group number field of the cards shown in Figs. 10, 12 and 14 is also perforated to represent the units digit value "9." By a similar plug connection digital impulses derived from columns 2 and 82 (Figs. 16c, 16d) for both the first and second reading and comparing stations cause the simultaneous energization of comparing relays R105 (Fig. 16c) and R205 (Fig. 16d) upon agreement, and dissimultaneous energization of said relays upon a disagreement. When digital values are the same in the tens column of two compared records, R104 and R204 relays are energized simultaneously and when the digital values are the same in the units column, R105 and R205 relays are energized simultaneously. Accordingly, a control circuit is exercised by each of these two pairs of relays. It will be seen that a circuit extends from line side 126 through CR103 circuit breaker (Fig. 16c) cam contacts to a wire 216. From the wire 216 there is a normally open circuit leading through R204b transfer contacts and R104b transfer contacts to the plug hub 217; and also a normally open branch circuit which extends from the wire 216 through transfer contacts R205b and R105b to the plug hub 218. It will be seen that upon a simultaneous energization of R204 and R104 relays the circuit between the wire 216 and the plug hub 217 is maintained open and the same open circuit condition ensues when R205 and R105 relays are energized simultaneously. However, if either one of the relays R104 and R204 or either one of the pair R105 and R205 is energized dissimultaneously, a circuit will be completed from the wire 216 to either the plug hubs 217 or 218, thereby indicating a disagreement in corresponding columns of two cards and irrespective of their code. The impulse then appearing at plug hubs 217 and 218 (Fig. 16c) is available as is well known in the art for any suitable control purposes, such as stopping the operation of the machine or producing some signal indication that a pair of successive cards do not agree in their digital values expressed in the fields utilized for comparison purposes.

While there have been shown and described and pointed out the fundamental novel features of the invention it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for comparing values on a pair of separate data representing elements, each bearing value designations in one of three different codes and designations separate from said value designations for signifying the three different types of codes, separate means for analyzing said value designations on each of a pair of said elements representing any two of said three different codes, means for sensing said type of code designation for detecting the codes of said elements, code converting means for converting according to the code detected by said sensing means value designations analyzed by the respective analyzing means to a common output code, and value designation comparing means controlled by the respective analyzing means and responsive to said common output code for determining the agreement or non-agreement of value designations of a pair of data representing elements.

2. In a machine for comparing data values of pairs of differently coded records each representing one of three different codes, means for sensing the type of code designation on each record for detecting the type of code on each record, separate means for analyzing data values of a pair of records representing any two of said three different codes, means controlled by said sensing means for converting under control of said separate analyzing means and in accordance with the codes of a pair of record data values in said different codes to a common output code, and means under control of said separate analyzing means and responsive to data values in said common output code for comparing a pair of records for determination of agreement or non-agreement.

3. In a machine for comparing data on pairs of differently coded records, means for detecting the type of code on each record and uni-deck or duo-deck data representation, separate means for analyzing a pair of records, means controlled by said detecting means for converting under control of said separate analyzing means and in accordance with the codes of a pair of records, data in said codes in a uni-deck or duo-deck record to a common output code, comparing means under control of said separate analyzing means and responsive to said common output code for comparing a pair of records for determination of agreement or non-agreement of data, and selectable means for operatively associating said comparing means with said separate analyzing means for uni-deck or duo-deck record in such manner as to effect (a) a comparison between data on pairs of uni-deck coded records; (b) between selected decks of a pair of duo-deck differently coded records; and (c) between a selected deck of a duo-deck record and a uni-deck coded record.

4. In a machine for comparing separate data representing elements, bearing value designations in a single unit code, or either of two combinational unit codes, separate means for analyzing said single unit or combinationally coded value designations on each of a pair of said elements, means for sensing the type of combinational code designation on said elements for detecting the particular combinational code of the value designations, code converting means to cause value designations to be read out under control of the separate analyzing means according to the code detected by said preceding means in a common single unit output code, and value designation comparing means controlled by the respective analyzing means and responsive to said common single unit output code for determining the agreement or non-agreement of value designations of a pair of data representing elements.

5. In a machine for comparing separate data representing records, each bearing value representing designations in one of three different codes and separate designations signifying the type of code on the record, separate means for analyzing said value designations on each of a pair of said records, means for feeding said records to said separate analyzing means, means for successively sensing said type of code designations for detecting the code of said records as said records are fed and prior to said analyzing operations, code converting means to convert, according to the code detected by said code sensing means and to read out under control of the respective analyzing means the value designations in a common output code, means controlled by the sensing means to render said converting means simultaneously operable for both analyzing means when said feeding means has fed a record to each separate analyzing means, and value designation comparing means controlled by the separate analyzing means and responsive to said common output code for determining the agreement or non-agreement of value designations of a pair of data representing elements.

6. In a machine for comparing data representations of pairs of differently coded records coded according to a first code, a second code or a third code, means for sensing the type of code designation on each record, separate means for analyzing data representations of a pair of records, means controlled by said sensing means upon sensing the type of code designation on a record either in said second code or third code for converting under control of either analyzing means data representation of a record of said second or third code to said first code, and means under control of said analyzing means and responsive to said first code for comparing data representations of a pair of records for determination of agreement or non-agreement.

7. In a record controlled machine for comparing successively fed records, having type-of-code designations and separate value designations in different codes which are to be compared, a plurality of analyzing means for simultaneously analyzing said value designations of a pair of records, means for sensing said type-of-code designations, a plurality of code converting means selected by said sensing means according to the code of said records for converting the value designations in the code on the record to a common output code, means for causing said value designations to be read out in said output code, and value designation comparing means responsive to said output code for comparing digital values of a pair of records for determination of their agreement or non-agreement.

8. In a machine for comparing successively fed records which are differently coded for value designations and bear type-of-code designations, a Presensing Station for presensing said type-of-code designations, a pair of reading stations having analyzing means for analyzing value designations at each station, a plurality of code converting means each for causing under control of said analyzing means the conversion of the code of the record analyzed to a common code for causing said values to be read out in said common code, means under control of said Presensing Station for selecting the appropriate code converting means and for rendering both converting means operable simultaneously for both reading stations whereby data values to be compared are read out simultaneously, a comparing device comprising elements adapted to be actuated according to the digit values read out, and means controlled by said comparing elements to determine the agreement or disagreement of the values read out from the respectvie analyzing means.

9. In a machine for comparing successively fed records which are differently coded for value designations and bear type-of-code designations, a Presensing Station for presensing said type-of-code designations, a pair of reading stations having electrical analyzing means for analyzing value designations at each station, a plurality of code converting means each for causing each analyzing means to convert and readout the electrical reading in the code of the record analyzing to a common digit impulse code, means under control of said Presensing Station for selecting the appropriate code converting means and for rendering both converting means operable simultaneously for both reading stations whereby data values to be compared are read out simultaneously as electrical digit impulses, a comparing device comprising a pair of electro-magnetic elements for each order adapted to be energized at differential digit impulse times according to the digit impulses read out of each analyzing means, and means controlled by said pair of electro-magnetic elements to determine in accordance with the simultaneous or dissimultaneous energization of a pair of electro-magnetic elements the agreement or disagreement of the digit impulses read out from the respective analyzing means.

10. In a machine for comparing successively fed records which are differently coded for value designations according to a first code and a second code and bear type-of-code designations, a Presensing Station for presensing said type-of-code designations, a pair of reading stations having separate analyzing means for analyzing value designations at each station, code converting means selected by said Presensing Station for causing said analyzing means to convert the code of the record having said second code to said first code, means to cause said analyzing means to read out values from both of said analyzing means in said first code, means under control of said Presensing Station for selecting the code converting means upon detecting a record having said second code, and for rendering said reading out means operable simultaneously for both reading stations whereby data values to be compared are read out of said analyzing means simultaneously in said first code, a comparing device comprising elements adapted to be actuated under control of the respective analyzing means according to the digit values read out of each analyzer, and means controlled by said comparing elements to determine the agreement or disagreement of the values read out from the respective analyzing means.

References Cited in the file of this patent
UNITED STATES PATENTS 2,475,315    Doty _____ July 5, 1949